US006890677B2

(12) United States Patent
Klitsner et al.

(10) Patent No.: US 6,890,677 B2
(45) Date of Patent: May 10, 2005

(54) FUEL CELL AND MEMBRANE

(75) Inventors: Tom Klitsner, Albuquerque, NM (US); Alan P. Sylwester, Albuquerque, NM (US); Gail N. Ryba, Santa Fe, NM (US); Thomas E. Zipperian, Edgewood, NM (US); Stanley H. Kravitz, Placitas, NM (US); Andrew Hecht, Sandia Park, NM (US)

(73) Assignee: Sandia Corporation, Albuquerque, NM (US)

( * ) Notice: Subject to any disclaimer, the term of this patent is extended or adjusted under 35 U.S.C. 154(b) by 209 days.

(21) Appl. No.: 10/056,736

(22) Filed: Jan. 24, 2002

(65) Prior Publication Data

US 2003/0082431 A1 May 1, 2003

Related U.S. Application Data

(63) Continuation-in-part of application No. 10/017,140, filed on Oct. 30, 2001, application No. PCT/US00/12510, filed on May 5, 2000.
(60) Provisional application No. 60/132,909, filed on May 6, 1999.

(51) Int. Cl.[7] .................. H01M 8/02; H01M 8/12; H01M 4/86
(52) U.S. Cl. .................. 429/34; 429/30; 429/33; 429/40
(58) Field of Search .............. 429/30, 32, 33, 429/34, 38, 39, 40, 41, 44

(56) References Cited

U.S. PATENT DOCUMENTS

| 4,255,247 A | | 3/1981 | Oda et al. |
| 4,328,080 A | | 5/1982 | Harris |
| 4,512,848 A | | 4/1985 | Deckman et al. |
| 4,774,152 A | | 9/1988 | Matsumura et al. .......... 429/12 |
| 4,980,016 A | | 12/1990 | Tada et al. |
| 4,987,477 A | | 1/1991 | Ikeno |
| 5,171,646 A | * | 12/1992 | Rohr ........................... 429/34 |
| 5,192,334 A | * | 3/1993 | Rohr et al. ............... 429/30 X |
| 5,294,504 A | | 3/1994 | Otagawa et al. |
| 5,631,099 A | | 5/1997 | Hockaday .................... 429/30 |
| 5,635,419 A | | 6/1997 | Geiss |
| 5,759,712 A | | 6/1998 | Hockaday .................... 429/30 |
| 6,051,329 A | * | 4/2000 | Fasano et al. ............... 429/30 |
| 6,127,058 A | * | 10/2000 | Pratt et al. .................... 429/30 |
| 6,387,559 B1 | * | 5/2002 | Koripella et al. ............ 429/34 |
| 6,541,149 B1 | | 4/2003 | Maynard et al. ............. 429/40 |
| 6,551,735 B2 | * | 4/2003 | Badding et al. .......... 429/32 X |
| 6,641,948 B1 | * | 11/2003 | Ohlsen et al. ............ 429/30 X |
| 6,660,423 B2 | * | 12/2003 | Neutzler et al. .............. 429/38 |
| 2002/0122972 A1 | * | 9/2002 | Klitsner et al. ............... 429/42 |
| 2002/0182479 A1 | | 12/2002 | Mallari et al. ................ 429/44 |

FOREIGN PATENT DOCUMENTS

JP  7-201348 A  4/1995

OTHER PUBLICATIONS

Herino, R., "Porosity and Pore Size Distributions of Porous Silicon Layers," *J. Electrochem. Soc*, vol. 134, No. 8, pp 1994–2000 (1987), month unknown.

Morrison, S.R., "Electrochemistry at Semiconductor and Oxidized Metal Electrodes," TEXTBOOK, p. 65–69, Plenum Press, New York, NY (1980), month n.a.

* cited by examiner

*Primary Examiner*—Stephen J. Kalafut
(74) *Attorney, Agent, or Firm*—Robert D. Watson; Jeffrey D. Myers

(57) ABSTRACT

Fuel cells and a novel membrane for use in fuel cells and manufacturing processes.

82 Claims, 17 Drawing Sheets

FUEL CELL AND MEMBRANE

CROSS-REFERENCE TO RELATED APPLICATIONS

This application is a continuation-in-part of U.S. patent application, Ser. No. 10/017,140 filed Oct. 30, 2001 which claims the benefit of the filing of U.S. International Application, Ser. No. PCT/US00/12510 filed May 5, 2000, entitled Fuel Cell and Membrane, which further claims the benefit of U.S. Provisional Patent Application Ser. No. 60/132,909, entitled Micro Fuel Cell Based on Planar Interdigitated Electrodes, filed on May 6, 1999, and the specifications thereof are incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

Field of the Invention (Technical Field)

The present invention relates to fuel cells and membranes.

SUMMARY OF THE INVENTION (DISCLOSURE OF THE INVENTION)

The present invention comprises novel fuel cells, porous material for use therein and methods of making the same. The present invention also comprises novel methods for embossing and molding materials. The present invention further comprises a combinatorial procedure for expeditiously testing designs.

In a preferred embodiment, a fuel cell, which may be formed entirely by semiconductor manufacturing methods, comprises a dielectric substrate material with a porous film disposed on its upper surface, wherein the film comprises at least one electrode, and channels extend through the dielectric material. A fuel source is disposed in relation to the channel aperture, preferably on a lower surface of the dielectric material. The fuel source of the preferred embodiment comprises hydrogen gas, alcohols, $O_2$, or other compounds containing redox pairs, including ambient air.

The porous film of the present invention comprises pores between approximately 5 nm and approximately 1000 nm in diameter, but preferably at least 0.18 $\mu$m in diameter. The porous film of the preferred fuel cell embodiment is prepared through etch-processing and comprises a solid electrolyte. The solid electrolyte may be disposed on the dielectric material by spin coating, lamination, or spraying. The film may be a proton exchange polymer such as Nafion® which may be used in conjunction with a moisture cap. However, the solid electrolyte may be a high temperature proton conducting electrolyte or an oxide conducting electrolyte. Oxide conducting electrolytes may comprise zirconia-based electrolytes and have high operating temperatures between approximately 100° C. and approximately 1000° C.

The porous film of the preferred embodiment may comprise a silicon-based thin film membrane, such as silicon nitride or silicon carbide. The membrane is a low stress, pre-tensioned membrane. The thin film membrane is between approximately 0.5 $\mu$m and approximately 20 $\mu$m in thickness and comprises a patterned and etched geometric array having an approximately 1 $\mu$m diameter and an approximately 2 $\mu$m pitch. The thin film is formed through low pressure chemical vapor deposition having pores formed through reactive ion etching. Such a thin film may be used as a mask for anodization etching processes.

The porous film may comprise a conductive layer utilizing gold, aluminum, platinum, other metals, metal alloys, or conductive organic materials. The porous film may further comprise a catalyst disposed on the solid electrolyte which may be a refractory material, such as platinum.

This catalyst disposition on the porous film results in a porous catalyst. A high temperature catalyst, e.g., Noble metals, non-Noble metals, metal oxides, and oxide compositions may be used. Noble metals of the preferred embodiment are selected from the group of Pt, Au, Ag, Pd, and Ag/Pd alloys. Non-Noble metals of the preferred embodiment are selected from the group of Ni, Co. Cu, and Fe. Metal oxides of the preferred embodiment are selected from the group of $PrO_2$, $CeO_2$, and $InO_3$. Preferred oxide compositions are manganites and cobaltites. The conductive layer and/or catalyst are disposed by chemical vapor deposition, physical deposition, evaporation, and ink deposition.

The at least one electrode of the present invention preferably comprises at least one anode and at least one cathode, wherein the anode and cathode may have different surface areas. In the preferred embodiment the anode surface area is between approximately two times and approximately ten times less than the cathode surface area, more preferably, it is approximately four times less than the surface area of the cathode. In the most preferable embodiment, the anode is approximately 40 $\mu$m wide by approximately 1 cm long, and the cathode is approximately 160 $\mu$m wide by approximately 1 cm long.

The dielectric substrate may be a silicon-based material, preferably silicon nitride. The channels may be pores, preferably formed by reactive ion etching, within the dielectric substrate which are surrounded by the substrate material serving as a dielectric barrier. In the preferred embodiment, every other dielectric barrier between an anode and a cathode additionally comprises a conductive layer coating. The dielectric barrier may comprise a width of between approximately 10 $\mu$m and 50 $\mu$m. In the most preferred embodiment, the width is approximately 25 $\mu$m. The resultant pores comprise at least one flow path for fuel to reach electrodes. Preferably, the aperture of the channels/pores corresponds to the surface area of the electrode. The channels of the present invention may be formed by joining at least two micromachined wafers.

The fuel cell of the present invention comprises geometric surfaces selected from the group of planes, curved surfaces, flexible surfaces, and cylinders. The apertures of the cylinders may comprise geometric figures comprising triangles, rectangles, circles, polygons, and ellipses.

The fuel cell of the present invention may comprise a bipolar cell comprised of two fuel cell units each comprising a dielectric substrate, a porous film disposed thereon, wherein the porous film comprises at least one electrode. In this bipolar cell embodiment, one unit's electrode comprises a cathode and the other comprises an anode.

Fuel cells of the present invention may have anodes and cathodes interposed in interdigitated planar array serpentine, or spiral patterns, and/or comprise parallel, series, or parallel-series configurations.

In the present invention, the fuel cell may additionally comprise at least one ohmic contact. The contract may comprise a coating on the lower surface of the dielectric substrate material. The coating may be selected from the group of aluminum, gold, silver, other metals, and metal alloys.

The fuel cell of the present invention may additionally comprise microswitching devices wherein, preferably, the devices selectively interconnect electrodes. These devices may be disposed within the channels to control fuel flow.

The preferred fuel cell comprises an etch and anodization processed porous electrode which may have cooling means to reduce fuel cell temperature and may be formed by semiconductor manufacturing methods. When the electrode is silicon-based, the silicon may be doped.

The present invention additionally comprises methods for making a fuel cell. In a preferred embodiment, forming a silicon-based electrode comprises the steps of providing a silicon-based substrate, etching at least one side of the silicon-based substrate, and anodizing the substrate and embossing a substrate comprising the steps of providing a support substrate forming a film on the support substrate, patterning features of the film, providing a second substrate, and embossing features of the film into the second substrate. The patterning may comprise adding and/or subtracting material from the film.

In a preferred embodiment of the present invention, making a mold includes the process of forming a fuel cell, including the steps of providing a silicon substrate, patterning the silicon substrate, and contacting the silicon substrate with a deformable material thereby imparting the pattern to the deformable material.

Further, the present invention comprises a lithography processing method of processing a substrate wafer which utilizes front and back side processing. Front side processing includes the steps of providing a clean wafer, depositing a film on the wafer depositing a photoresist layer onto the film; masking the photoresist layer with a geometric array, exposing the masked photoresist layer, developing the photoresist layer, rinsing the photoresist layer, and etching the layered wafer. The film may be disposed through chemical vapor deposition, physical deposition, or sputtering, and may be silicon-based, preferably silicon carbide. Further, etching is preferably accomplished through reactive ion etching. Back side processing includes the steps of providing a clean wafer, depositing a photoresist layer, waiting at least approximately an hour, masking the photoresist layer with a geometric array, aligning the mask with the masking of the front side, exposing the photoresist layer, developing the photoresist layer, rinsing the photoresist layer, and etching the layered wafer. The film may be disposed by sputtering and baking the wafer. As with the front side processing, the etching process in back side processing may be done by reactive ion etching which may comprise alternate polymer deposition.

Finally, the present invention comprises a packaging method which may be used in processing wherein a small amount of gold is evaporated, deposited onto a ceramic package, and an electrode is attached to the package with a gold conductive epoxy.

The fuel cell of the present invention may comprise at least one etch-processed, conductive, porous film comprising at least one electrode wherein the film optionally comprises at least one layer. The at least one layer optionally comprises at least one dielectric layer and at least one conductive layer wherein the dielectric layer optionally comprises silicon and the conductive layer optionally comprises at least one material selected from the group consisting of gold, aluminum, platinum, and a conductive organic material.

In a preferred embodiment, a fuel cell of the present invention comprises at least one catalyst. In a preferred embodiment, the inventive fuel cell comprises at least one support substrate for supporting the film, and preferably wherein the support substrate comprises at least one fuel flow path.

The present invention also comprises a process for making an etch-processed, porous film comprising the steps of: providing a support substrate; forming a film on the support substrate; and etching pores in the film; and preferably further comprises the step of etching the support substrate; and preferably wherein the film comprises at least one layer selected from the group consisting of at least one conducting layer and at least one dielectric layer.

The present invention further comprises an embodiment comprising a fuel cell that comprises an etch and anodization processed, silicon-based, porous electrode, and preferably further comprising at least one catalyst.

The present invention comprises a method of making a silicon-based porous electrode comprising the steps of: providing a silicon-based substrate; etching at least one side of the silicon-based substrate; anodizing the etched silicon-based substrate thereby forming pores in the silicon-based substrate.

The present invention comprises a method of embossing a substrate comprising the steps of: providing a support substrate; forming a film on the support substrate; patterning features to the film; providing a second substrate; and embossing features of the film into the second substrate; and preferably wherein patterning comprises at least one step selected from the group consisting of adding material to the film and subtracting material from the film.

The present invention comprises a method of making a mold comprising the steps of: providing a silicon substrate; patterning the silicon substrate; and contacting the silicon substrate with a deformable material thereby imparting the pattern to the deformable material, and preferably wherein patterning comprises at least one step selected from the group consisting of adding material to the film and subtracting material from the film.

The present invention further comprises a method of combinatorial experimentation comprising the steps of: providing materials for making fuel cells wherein the materials comprise a silicon substrate; making a plurality of fuel cells on the silicon substrate; and testing the fuel cells.

In a preferred embodiment, fuel cells of the present invention are capable of operation at elevated temperatures, for example, temperatures greater than approximately 100 C. In a preferred embodiment of a fuel cell of the present invention, anode and cathode electrodes comprise different surface areas that optionally compensate for fuel characteristics.

A primary object of the present invention is to satisfy the need for compact and durable fuel cells.

A primary advantage of the present invention is compactness and durability when compared to traditional fuel cells.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1B:
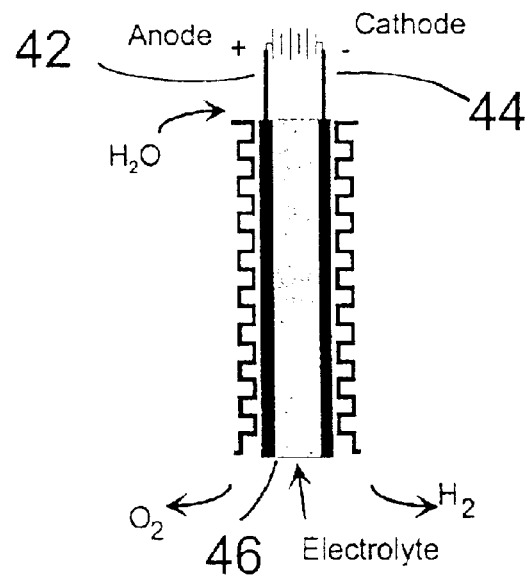
FIG. 1b is a diagram of a electrolysis cell.

DESCRIPTION OF THE PREFERRED EMBODIMENTS (BEST MODES FOR CARRYING OUT THE INVENTION)

The present invention comprises fuel cells and a novel membrane for use in fuel cells. A particular preferred embodiment comprises a novel porous thin film membrane whereas an alternative embodiment comprises a porous layer formed through etching of a wafer. Details of this alternative "wafer membrane" embodiment and the "thin layer membrane" embodiment are disclosed below.

Fuel cells of the present invention are configurable in a variety of configurations. Such configurations include bipolar and planar configurations. In general, bipolar configurations comprise a proton transfer material disposed between an anode and a cathode whereas planar configurations comprise a proton transfer layer covering a layer comprising at least one anode and at least one cathode. Bipolar configurations inherently comprise a sandwich whereas planar configurations optionally comprise a sandwich. Bipolar configurations inherently comprise at least two wafers whereas planar configurations comprise at least one wafer. For example, in a preferred embodiment of a planar configuration fuel cell, a single wafer comprises flow paths for hydrogen and oxygen fuels. In an alternative planar configuration embodiment, flow paths for hydrogen and oxygen, or other fuels, are constructed through use of at least two wafers.

In a preferred embodiment, planar configuration fuel cells comprise a porous thin layer membrane. This thin membrane comprises, for example, pores created from use of an etching process. This membrane further comprises gold and platinum wherein gold serves as an electron conductive material and platinum serves as a catalyst. In such a preferred embodiment, a mask is used to selectively apply gold to areas of the thin membrane and another mask is used to selectively apply platinum to certain gold covered areas of the thin membrane. The thin membrane selectively comprises at least one anode and at least one cathode. Of course for a bipolar fuel cell, the thin membrane optionally comprises at least one anode and/or at least one cathode.

In a preferred embodiment, fuel cells of the present invention comprise at least one porous silicon membrane. According to the present invention, a porous silicon membrane is fabricated through an etching process wherein a first side of a, for example, silicon wafer on which a silicon carbide thin film has been deposited is etched to expose conductive silicon and a second side is etched using a process comprising, for example, but not limited to, Bosch reactive ion etching. The first side comprises etching to a depth of approximately 1 micron whereas the second side comprises etching to a depth to within approximately 50 microns of the first side. The exposed silicon is made porous by a porous silicon anodization process. The resulting approximately 50 micron porous silicon region disposed between the first and second sides comprises a porous membrane. This membrane is coatable with, for example, a catalyst. In a preferred embodiment, a fuel cell is formed by flowing fuels through two platinum coated porous wafer membranes wherein a proton conductive layer is sandwiched there between.

Figure 1A:
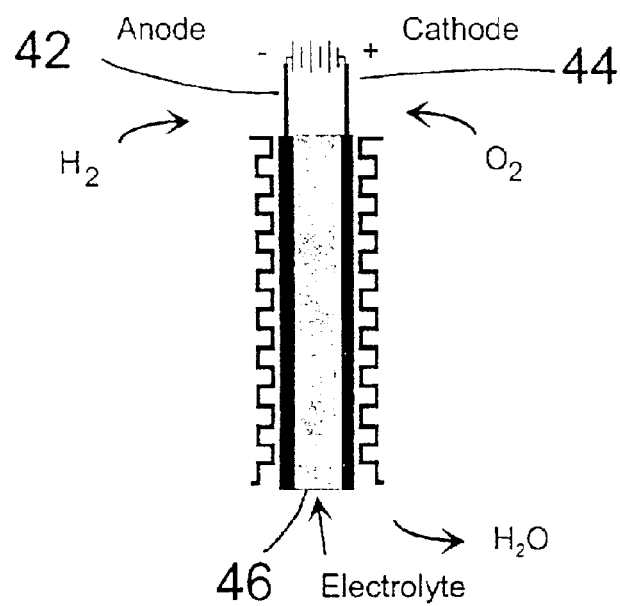
FIG. 1a is a diagram of a fuel cell for energy generation.

A bipolar device 40 suitable for use as a fuel cell, as shown in FIGS. 1a and 1b, comprises an electrolyte layer 46 sandwiched between an anode 42 and a cathode 44. The device 40 is generally operable in two modes: a fuel cell mode and an electrolysis mode. In the fuel cell mode, hydrogen and oxygen are consumed thereby producing water and energy. In the fuel cell mode, energy is available as an electrical potential across anode 42 and cathode 44. In the electrolysis mode, water and energy are consumed thereby producing oxygen and hydrogen. In the electrolysis mode, energy is applied across the anode 42 and the cathode 44. In either mode, diffusion and/or transport of constituents are design considerations. The present invention is not limited however to hydrogen gas and oxygen gas fuels; methanol and other fuels (supplied as solid, gas, and/or liquid) are also within the scope of the present invention.

Figure 2A:
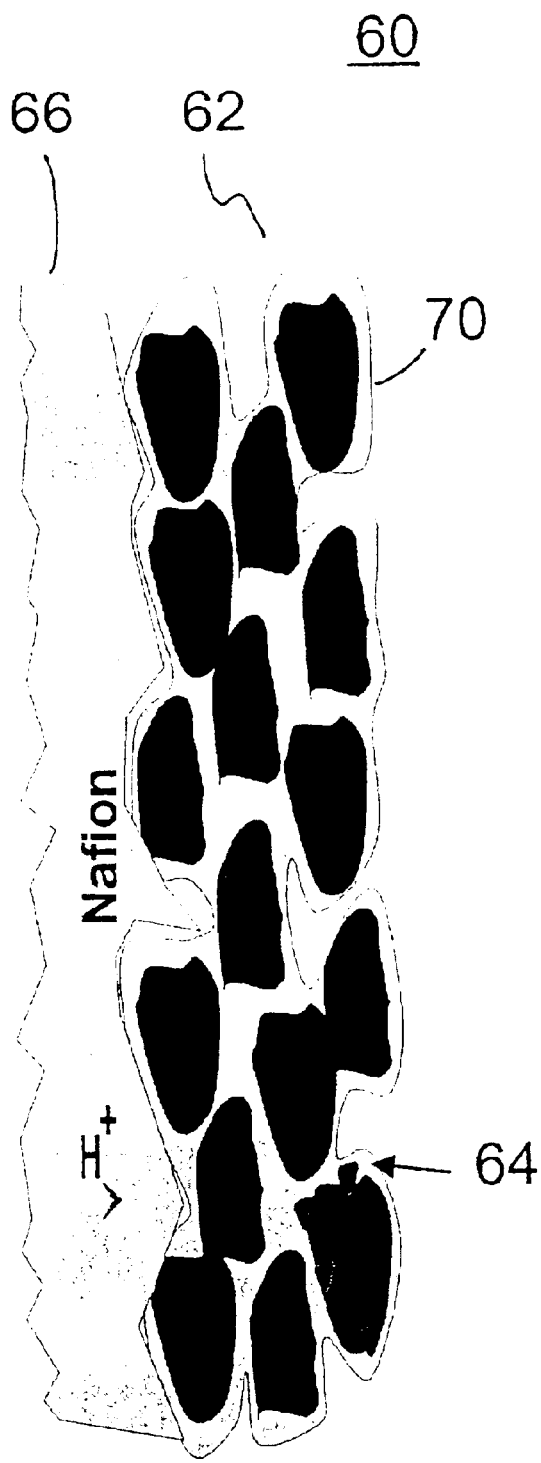
FIG. 2a is a diagram of a proton conductor comprising a catalyst.
Figure 2B:
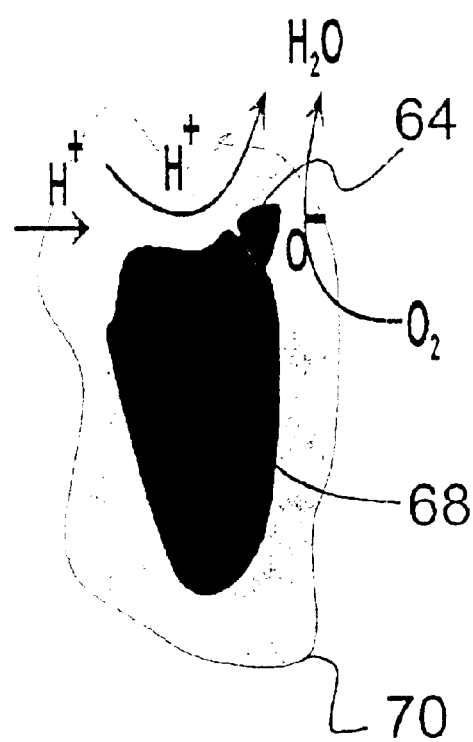
FIG. 2b is a diagram of a particle supporting a catalyst.

A schematic showing diffusion of water, hydrogen and oxygen is shown in FIG. 2a and FIG. 2b. FIG. 2a shows a cross section of an electrode 60 while FIG. 2b shows diffusion around a single particle 68. As shown in FIG. 2a, a layer of carbon supported 62 platinum catalyst 64 is disposed on the surface of a membrane 66. In this particular example, the membrane 66 comprises a NAFION® material (E. I. Du Pont de Nemours, Del.—a porous plastic material) that allows for transport of hydrogen atoms (protons) through an aqueous phase 70 comprising, for example, water. Of course, the present invention is not limited to the use of NAFION® material; thus, other materials that can transport hydrogen ions, especially those which are non acqueous solid electrolytes and which can tolerate temperatures above 100 C., are within the scope of the present invention. Other materials comprise, for example, but are not limited to, silicon-based material comprising organic material comprising proton donors are within the scope of the present invention as alternatives to NAFION® material. Additionally, while platinum is the preferred catalyst, other materials such as but not limited to Ru or a Pt—Ru alloy may be utilized. FIG. 2b shows the transport of protons and oxygen through the aqueous phase 70 to the catalyst 64 where water is formed.

Figure 3:
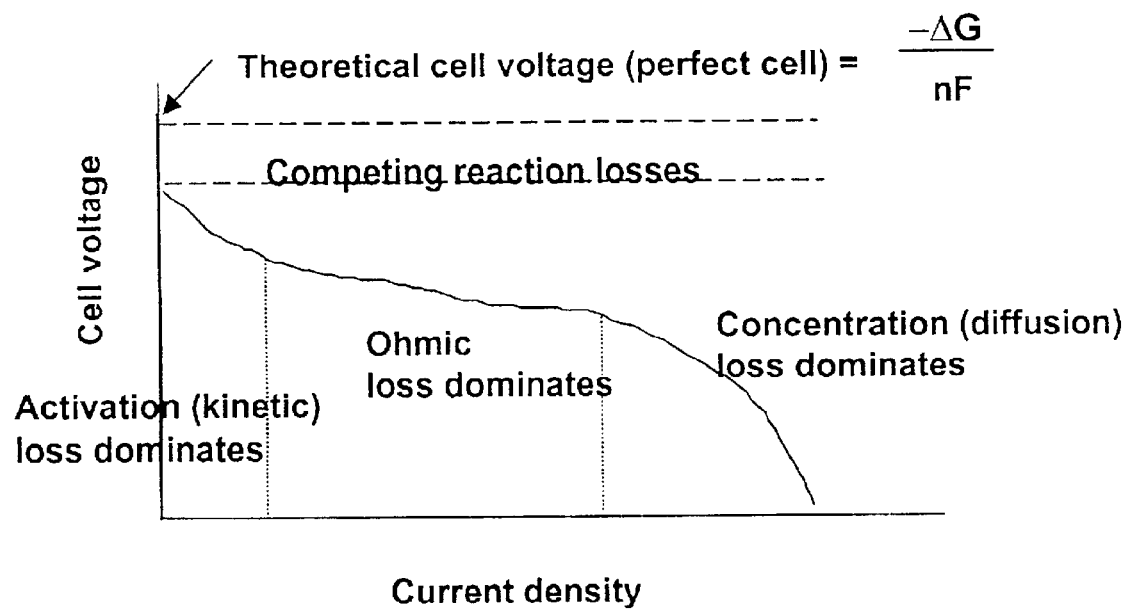
FIG. 3 is a plot of cell voltage versus current density.

FIG. 3 shows a plot of fuel cell voltage versus current density. For a "perfect" fuel cell, cell voltage is constant over current density and described by the free energy divided by the product of number of electrons transferred and Faraday's constant. In reality, cell voltage is not constant over a range of current density. Instead, cell voltage decreases from a theoretical value (including, for example, competing reaction losses) to a minimal value that approaches zero as current density is increased. At first, cell voltage decreases due to activation losses due to kinetic concerns. Next, at a higher current density, Ohmic losses dominate thereby leading to a further decrease in cell voltage. Thereafter, at higher current densities, diffusion or concentration losses dominate. According to the present invention, a novel fuel cell comprising novel materials overcomes limitations that, in part, lead to decreased cell voltage.

Figure 4:
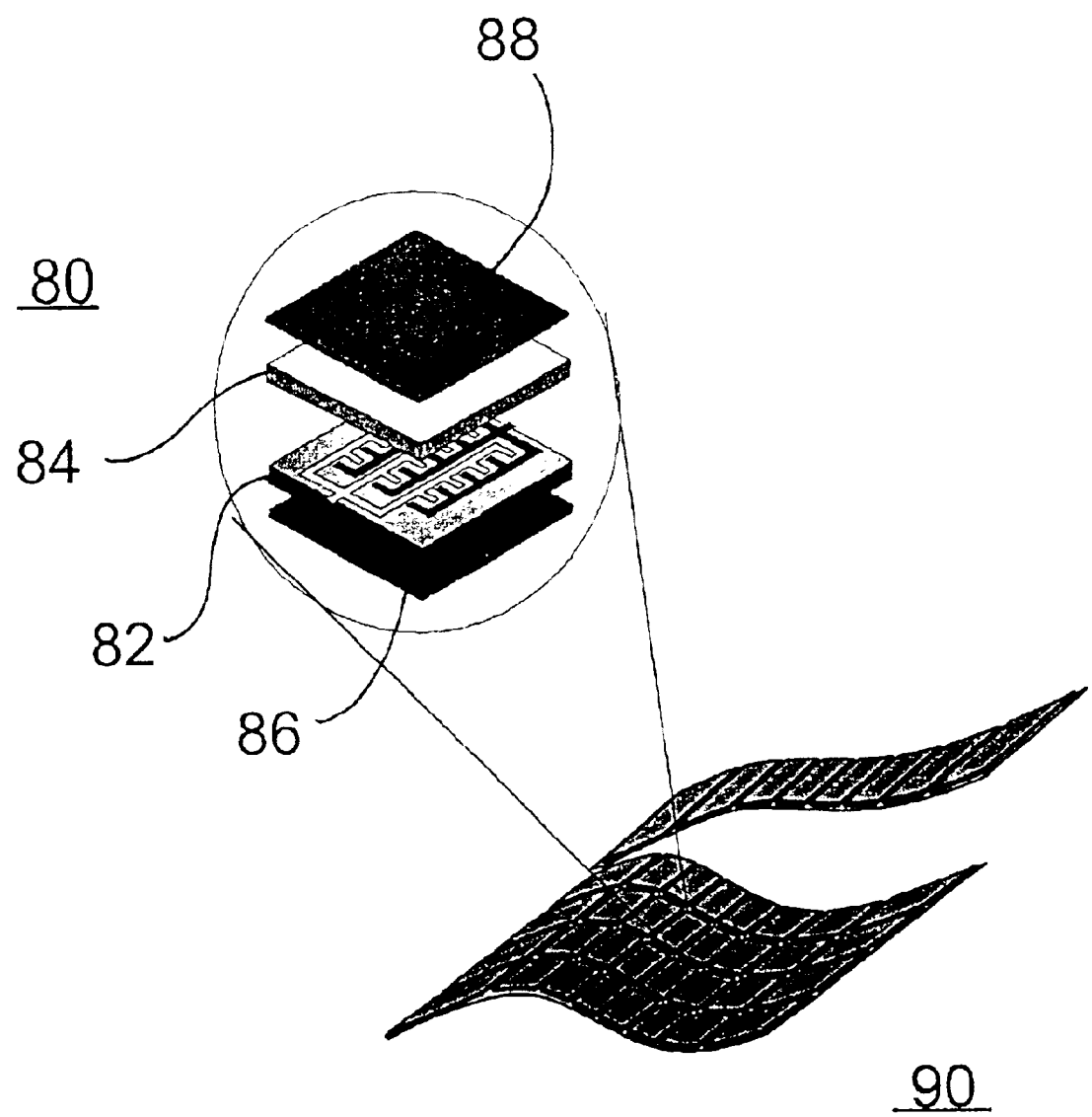
FIG. 4 is a diagram of a preferred embodiment of a planar fuel cell of the present invention.

A preferred embodiment of a planar fuel cell is shown in FIG. 4. In this embodiment, the planar fuel cell 80 comprises an anode and cathode array 82 that is in contact with a proton conducting membrane 84. In this embodiment, the array 82 is further in contact with a source of hydride 86 and the membrane 84 is in contact with a cap 88. In a preferred embodiment, the cell comprises a hydride source 86 upon which an array 82 is placed, upon which a proton conductor 84 is placed, upon which a cap 88 is placed. An inventive process for manufacturing fuel cells of the present invention allows for manufacture of such cells using the materials, processes and equipment common to the semiconductor industry and in multi-chip modules or in sheets comprising a plurality of fuel cell modules 90. The planar fuel cells shown in FIG. 4 are optionally modifiable through, for example, elimination of the cap 88 and placement of an opposing array 82 onto the membrane layer 84 thereby forming a sandwich configuration. A bipolar configuration comprising one array serving as an anode and a second opposing array serving as a cathode is also within the scope of the present invention.

Figure 5:
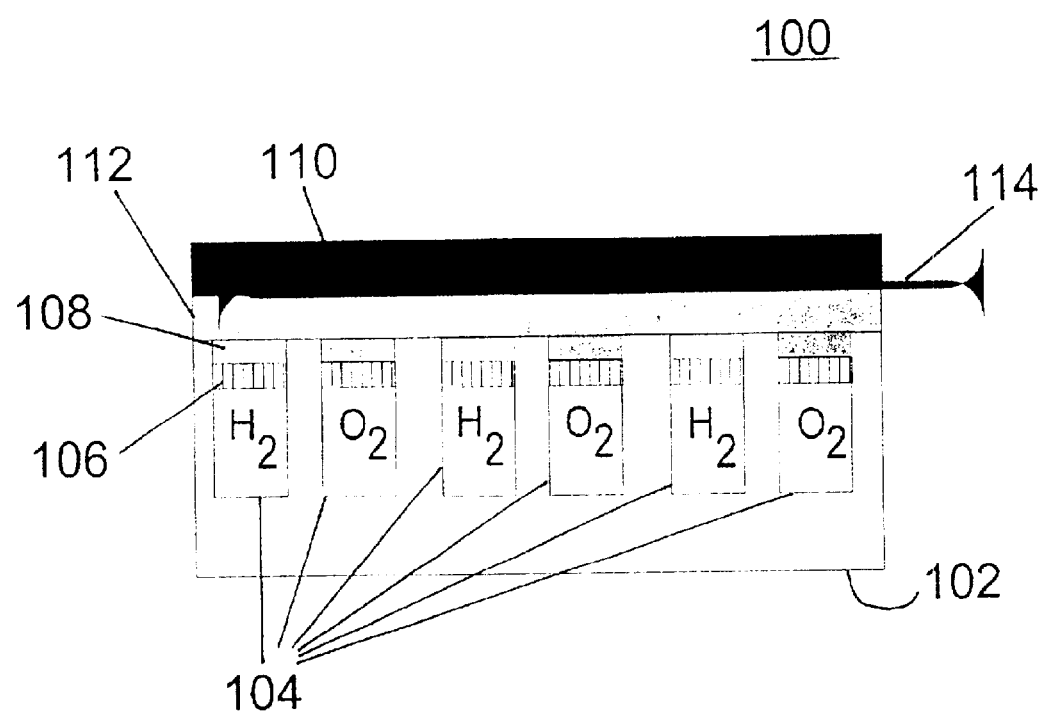
FIG. 5 is a cross-sectional diagram of a preferred embodiment of a planar fuel cell of the present invention.

In a preferred embodiment, the fuel cell comprises a planar structure. Such an embodiment of a fuel cell 100 is shown in FIG. 5. As shown in FIG. 5, this cell comprises a silicon cap 102. This cap 102 comprises fuel flow paths, for example, flow channels 104. In this particular embodiment, the cap 102 comprises at least two independent paths 104, for example, one for hydrogen and another for oxygen or air. A porous material 106 covers the flow paths 104. Adjacent to the porous material or deposited thereon is at least one catalyst layer. In this embodiment, the catalyst layer forms a catalyst electrode 108. In a preferred embodiment, the at least one catalyst electrode 108 comprises platinum, however, other catalysts, including but not limited to Ru or a Pt—Ru alloy may also be used. Fuel diffuses and/or is transported through the porous material 106 and reaches the at least one platinum anode electrode 108 (e.g., hydrogen fuel) and at least one platinum cathode electrode 108 (e.g., oxygen fuel) whereby, for example, water and an electrical potential between the anode and cathode electrodes are generated. Also shown in FIG. 5 are at least one electrolyte material 110, 112 and a cooling fluid 114. One of these layers, or alternatively an additionally layer, comprising the ability to control membrane moisture is within the scope of the present invention. Moisture control is germane when a NAFION® membrane is used because this class of membrane materials rely on moisture to facilitate proton transfer. In alternative embodiments of the present invention, proton transfer membranes that do not rely on moisture are used. Such membranes typically operate at temperatures greater than the operating temperatures of the NAFION® class of membranes.

Figure 6C:
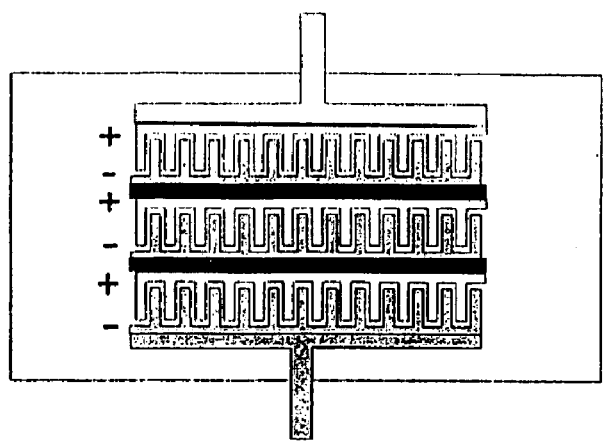
FIG. 6c is a diagram of a preferred embodiment of an electrode array of the present invention.
Figure 6B:
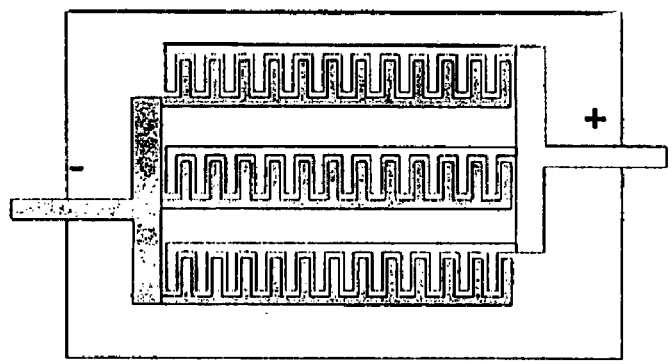
FIG. 6b is a diagram of a preferred embodiment of an electrode array of the present invention.
Figure 6A:
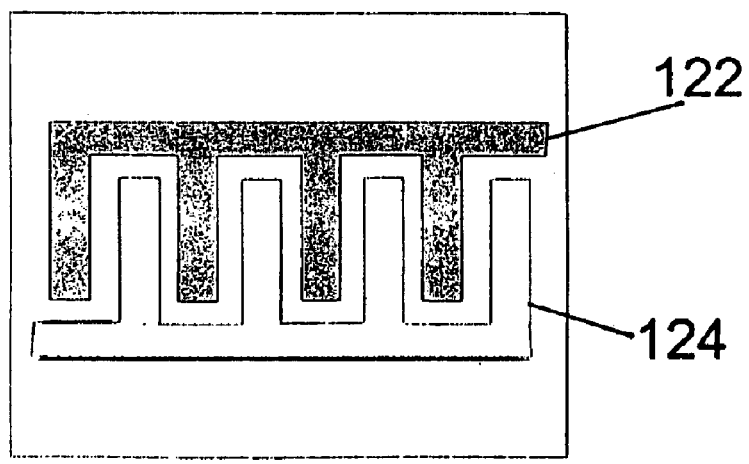
FIG. 6a is a diagram of a preferred embodiment of an electrode array of the present invention.

Various embodiments of electrode configurations of the present invention are shown in FIG. 6a, FIG. 6b and FIG. 6c. As shown in FIG. 6a, the electrode array 120 comprises a porous film cathode 122 and a porous film anode 124. In a preferred embodiment, these films 122, 124 comprise platinum, but may be comprised of other catalytic materials. The width of each of the four legs of each electrode is, in a preferred embodiment, on the order of approximately 5 microns. The invention is not limited to anode and cathode electrodes of equal size and/or dimensions. For example, anode area optionally comprises an area less than that of cathode area. In a preferred embodiment, anode area optionally comprises from approximately two times less to approximately ten times less the cathode area. Depending on the type of fuel, an embodiment comprising an anode area greater than a cathode area is within the scope of the present invention. As shown in FIG. 6b and FIG. 6c, electrodes are optionally oriented in parallel, in series, or alternatively, a combination of both.

Figure 7:
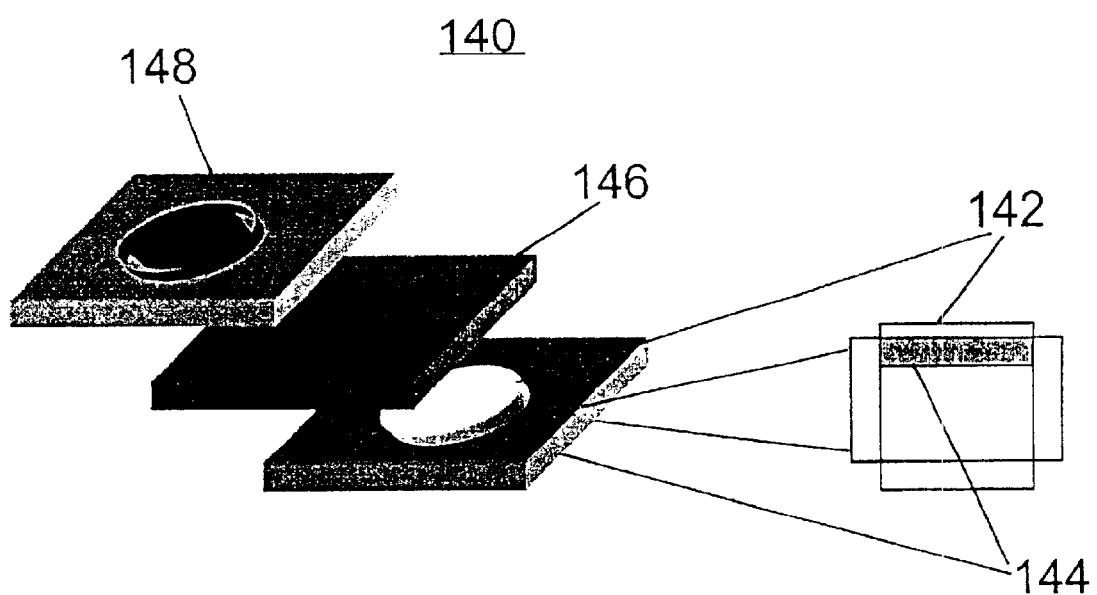
FIG. 7 is a diagram of a preferred embodiment of a bipolar cell of the present invention.

A bilayer or bipolar structure of a silicon-based porous electrode of the present invention 140 is shown in FIG. 7. According to this embodiment, preferably a platinum catalyst 142 is deposited on the surface of a silicon wafer comprising a porous membrane 144. A proton conducting material 146, such as NAFION®, is placeable in contact with the platinum catalyst layer 142. Further, a silicon wafer of optionally identical structure 148 is placeable in contact with the porous material 146. In this embodiment, one catalyst coated porous wafer serves as an anode and the other catalyst coated porous wafer serves as a cathode. Hydrogen gas is made to flow through the anode gas diffusion electrode from the back. The cathode is air breathing, and allows waste water to exit the electrode through the back.

Figure 8:
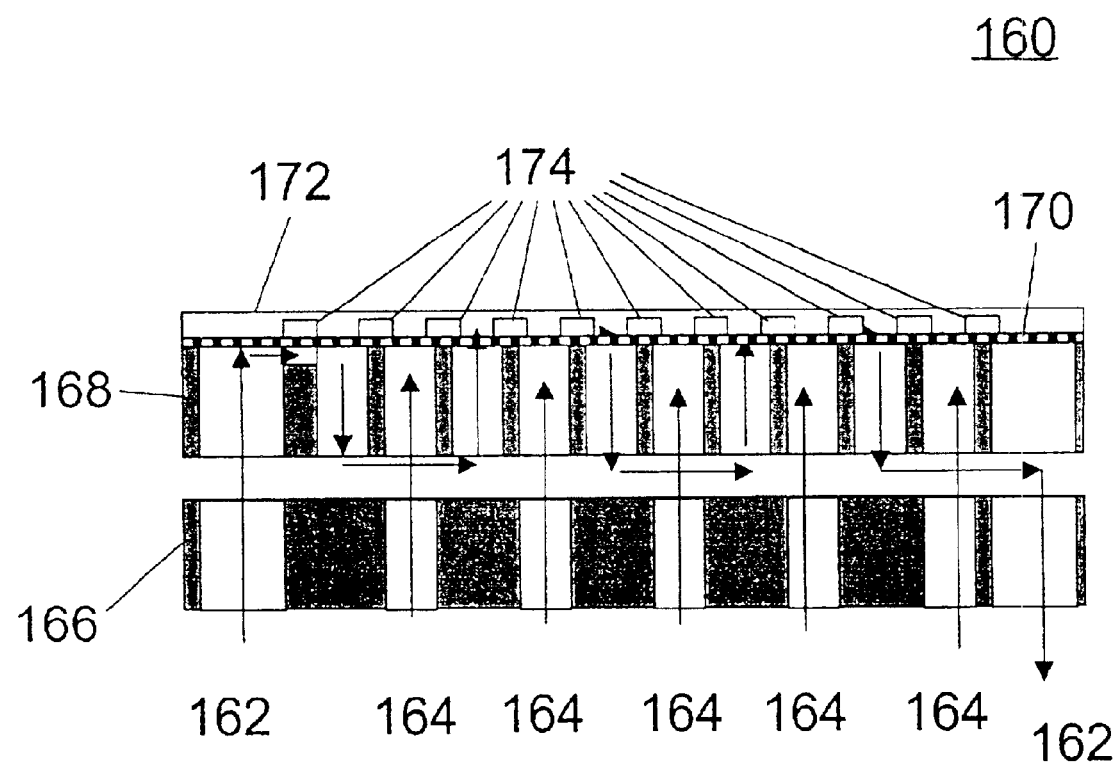
FIG. 8 is a cross-sectional diagram of a preferred embodiment of a fuel cell of the present invention.
Figure 9:
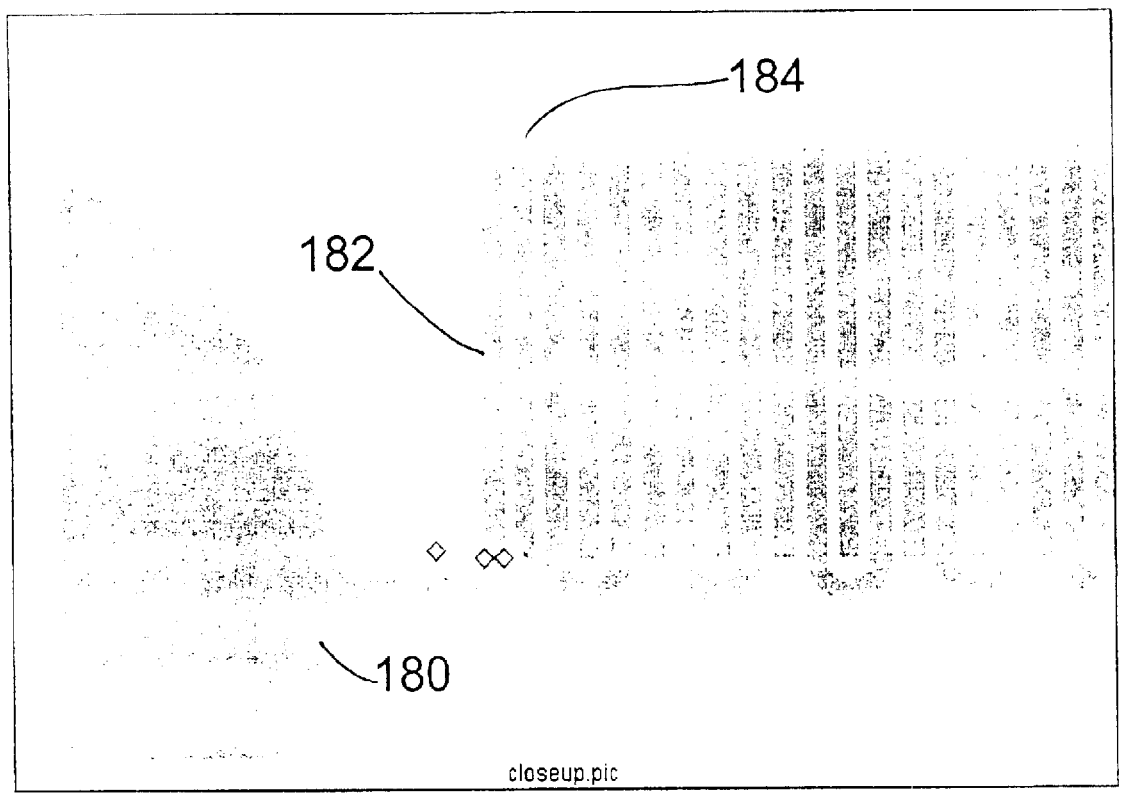
FIG. 9 is a sectional plan view diagram of a flow path of a preferred embodiment of the present invention.
Figure 10:
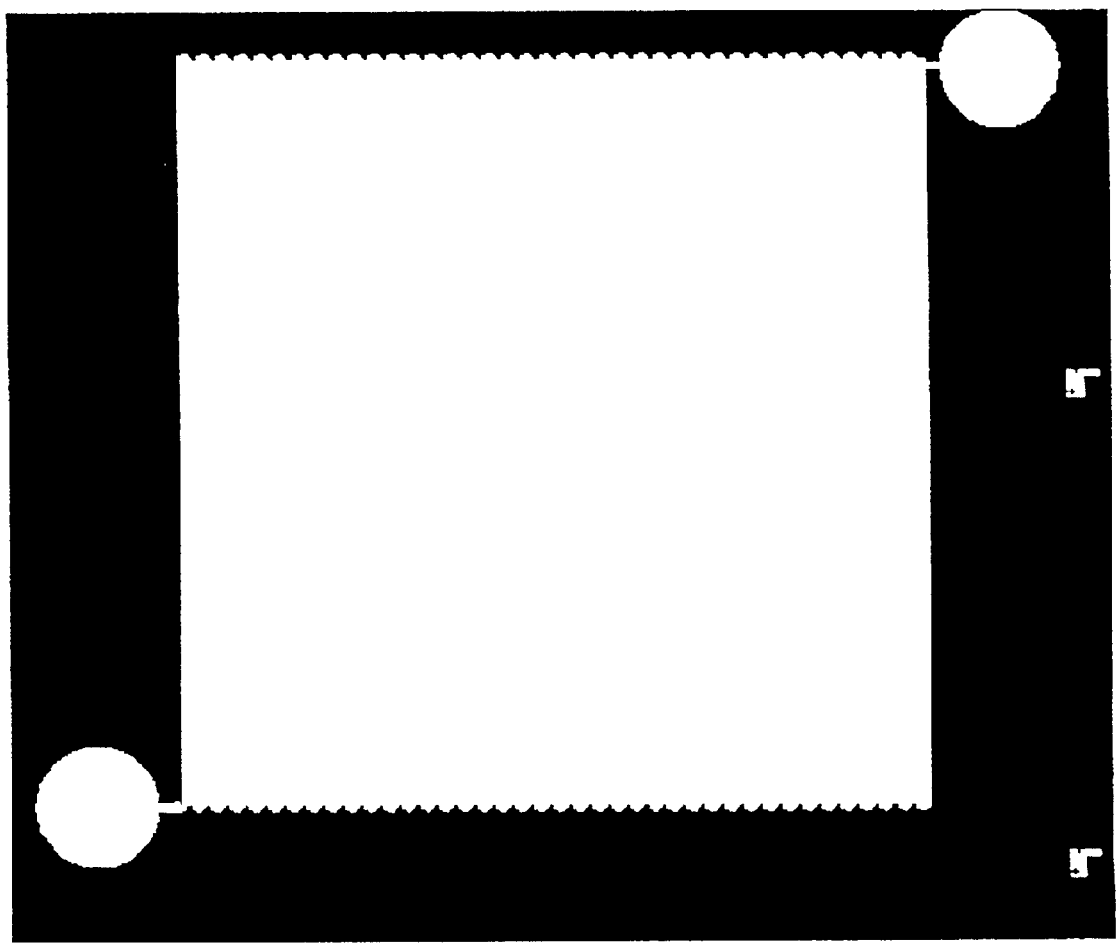
FIG. 10 is a plan view diagram of a fuel cell of a preferred embodiment of the present invention.

A cross section of a planar silicon fuel cell of a preferred embodiment of the present invention is shown in FIG. 8. This cell 160 comprises two silicon wafers 166, 168 comprising flow paths for hydrogen 162 and flow paths for air 164. The two wafers 166, 168 are manufactured, for example, micro-machined, and then bonded together to form the flow paths 162 and 164 (shown in an exploded view in FIG. 8). The horizontal arrows represent flow through a bend, for example, the bends comprising a serpentine path as shown in FIG. 9 and FIG. 10. A layer comprising etched pores 170, catalyst and current collector 174, is integral with the upper silicon wafer 168 and in contact with a proton exchange material 172, comprising for example a proton exchange polymer. In a preferred embodiment, the current collector comprises gold and the catalyst comprises platinum deposited on porous gold covered electrodes. However, other metals or metal alloys (e.g., aluminum, copper, steel, etc.) may comprise the current collector and other catalytic materials may be utilized.

Figure 11:
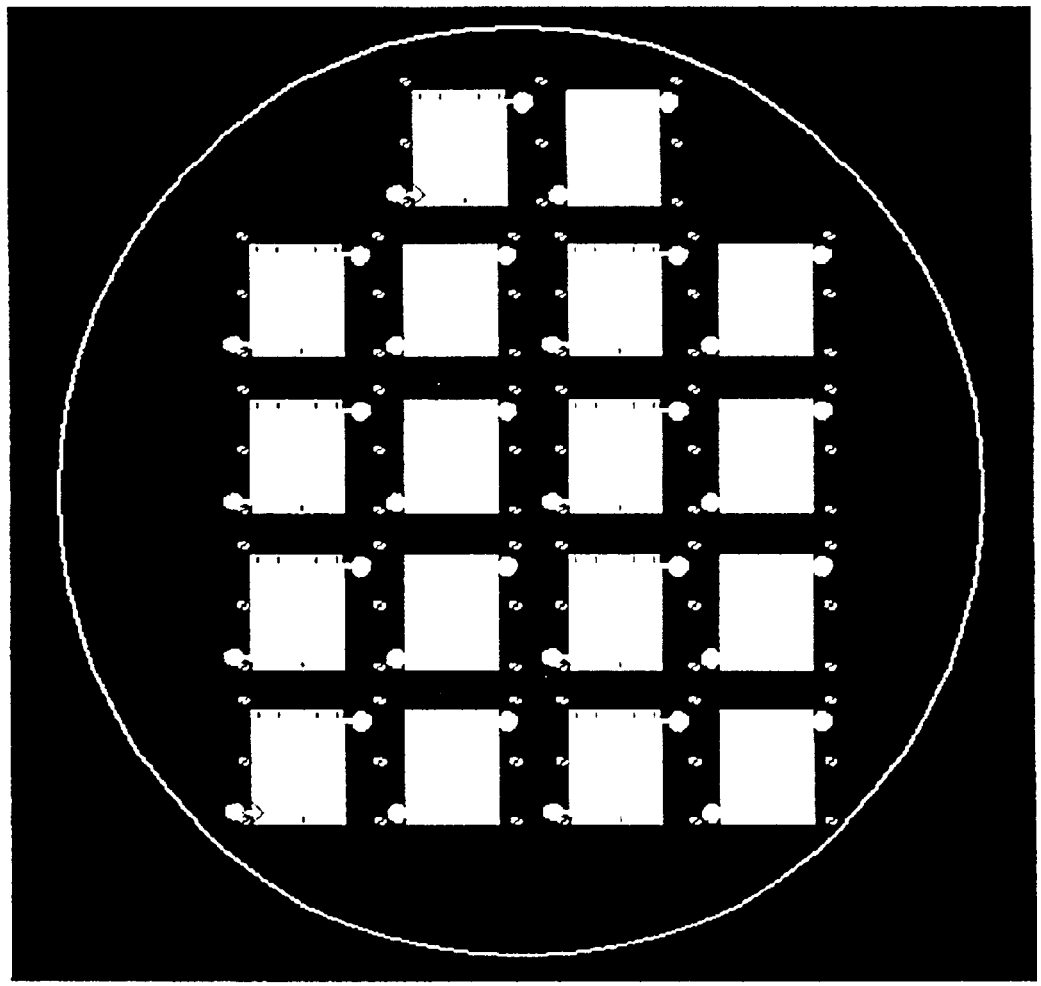
FIG. 11 is a plan view diagram of a plurality of fuel cells according to a preferred embodiment of the present invention.

A plan detailed view of the back side of the top wafer of a planar silicon fuel cell of a preferred embodiment of the present invention is shown in FIG. 9. This embodiment comprises an inlet for hydrogen 180 and optionally an outlet for hydrogen, not shown. Hydrogen gas entering the cell contacts at least one anode 182 whereas at least one air breathing cathode 184 is interposed between the at least one anode 182. The at least one cathode 184 is open to the atmosphere allowing air to enter, and comprises permeability to water. In a preferred embodiment, the at least one anode and the at least one cathode comprise individual path widths on the order of approximately 40 microns wherein a barrier separates the cathode and anode path by a width on the order of approximately 25 microns. In a preferred embodiment, the barrier comprises a dielectric barrier. Of course, anode and cathode widths are optionally variable by approximately an order of magnitude greater or lessor wherein anode and cathode widths are not necessarily equal. Furthermore, width may vary as a function of length. A similar but expanded view of a cell as shown in FIG. 9 is shown in FIG. 10. The present invention is not limited to such serpentine configurations; spiral and other configurations are within the scope of the present invention. FIG. 11 shows 18 cells on a single wafer. The present invention allows for manufacture of cells comprising different properties; therefore, all 18 cells are optionally the same or different, including grouped different and individually different.

Silicon Structures

Silicon structures of the present invention are manufactured using standard silicon fabrication techniques, including, but not limited to, lithography. Referring to FIG. 8, a preferred embodiment of the present invention comprises silicon structures comprising fuel flow paths and a layer comprising etched pores, for example, a thin layer membrane. In this particular embodiment, the layer comprising etched pores comprises, for example, a thin layer of silicon nitride that has been deposited onto a wafer. In an alternative embodiment, a porous layer is formed by patterning and reactive ion etching pores in a silicon nitride thin film, and patterning and etching the silicon wafer from the back using a process comprising for example, Bosch reactive ion etching. In this alternative embodiment, the front side and back side of a wafer are etched to create a porous membrane. Details of this alternative "wafer membrane" embodiment are disclosed below followed by details of the "thin layer membrane" embodiment. Of course, some of the processes and features of one embodiment are applicable to the other.

Wafer Membrane Embodiment

In a preferred embodiment comprising lithography, the front of a silicon wafer is processed differently than the back of a silicon wafer. Such processes are depicted in FIG. 12a and FIG. 12b for front and back processing, respectively.

Front Side Processing

Figures 12A, 12B:
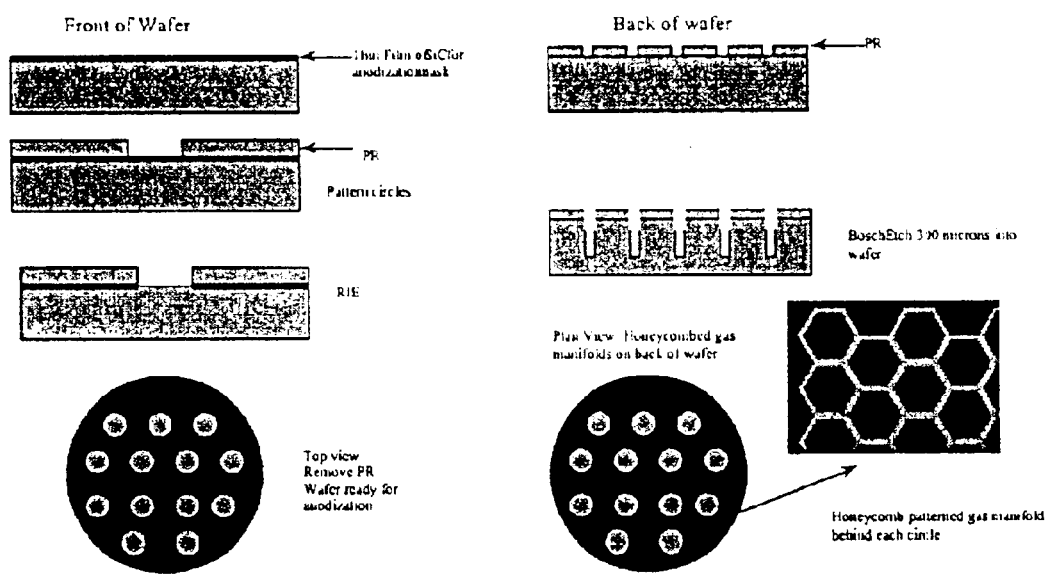
FIG. 12a is a schematic diagram of a lithography process according to a preferred embodiment of the present invention.
FIG. 12b is a schematic diagram of a lithography process according to a preferred embodiment of the present invention.

The process depicted in FIG. 12a comprises the steps of providing a clean wafer; depositing through chemical vapor deposition ("CVD"), or other suitable process, an approximately 0.5 micron thick film onto the wafer, for example, a silicon carbide film or other film that can survive anodization in hydrogen fluoride; depositing a photoresist ("PR") layer onto the film; masking the PR layer with an array of, for example, approximately 1 cm circles; exposing the masked PR layer for approximately 6.5 seconds; developing the PR layer; rinsing the developed PR layer; and etching the layered wafer using reactive ion etching ("RIE").

Back Side Processing

Figure 13:
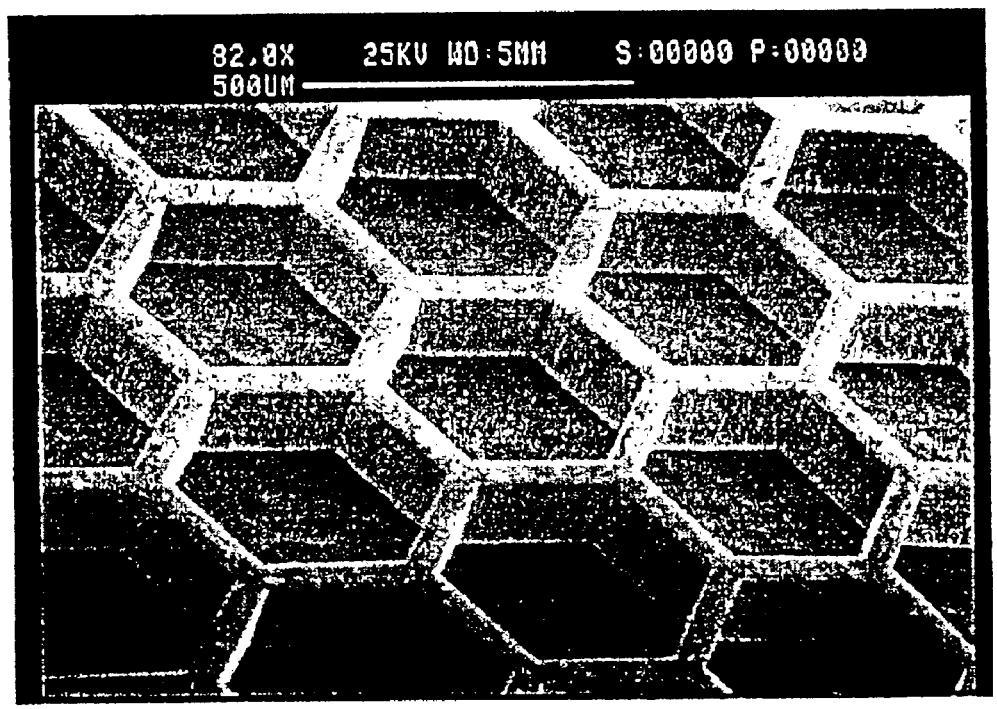
FIG. 13 is an electron micrograph plan view of an etched silicon wafer according to a preferred embodiment of the present invention.
Figure 14A:
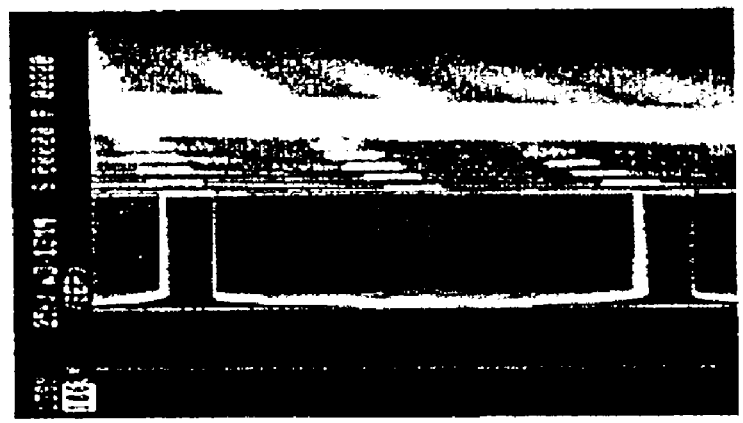
FIG. 14a is an electron micrograph side view of an etched silicon wafer according to a preferred embodiment of the present invention.
Figure 14B:
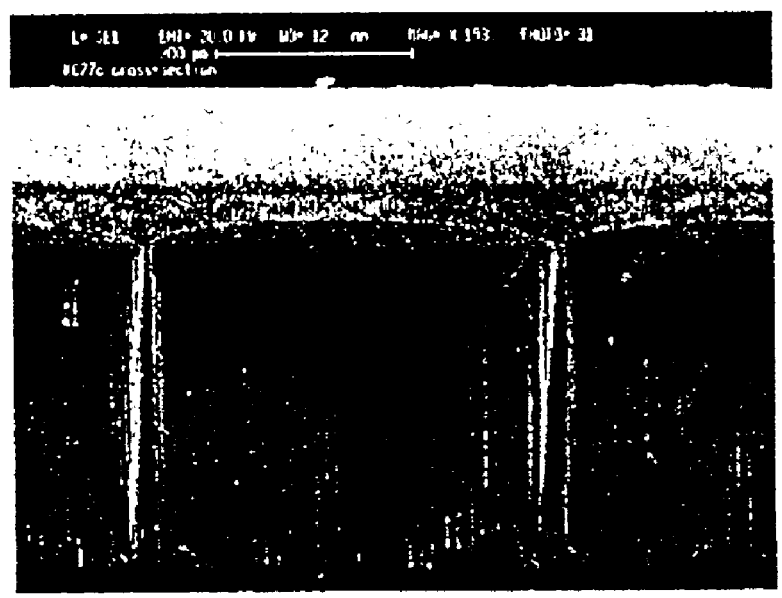
FIG. 14b is an electron micrograph side view of an etched silicon wafer according to a preferred embodiment of the present invention.

The process depicted in FIG. 12b comprises the steps of: providing a clean wafer; depositing a PR layer, comprising, for example, spinning at approximately 3,500 rpm for approximately 30 seconds and baking for approximately 3.5 minutes at approximately 110° C.; waiting at least approximately one hour before performing a next step; masking with a mask comprising an array of circles and/or polygons, for example, hexagons, wherein masking further comprises aligning the mask to indicia on the front side of the wafer; exposing the masked PR layer for approximately 10 seconds; developing the PR layer in, for example, an approximately 4:1 AZ type developer for approximately 2.5 minutes; rinsing the PR layer; and etching the layered wafer using Bosch reactive ion etching to achieve, for example, a thickness of between approximately 50 microns and approximately 100 microns between the front side and the bottom of the holes created by the process. The last step, Bosch reactive ion etching, optionally comprises alternate polymer deposition and etching wherein, for example, the end effect is to remove polymer from horizontal surfaces but not from vertical surfaces (e.g., side wall surfaces). FIG. 13 shows an electron micrograph plan view of a hexagonally etched wafer. FIG. 14a and FIG. 14b show electron micrograph side views of a hexagonally etched wafer.

Anodization

After front and back side processing, the wafer is anodized. In a preferred embodiment, anodizing comprises anodizing at approximately 80 mA per square centimeter in an approximately 1:1 solution of approximately 49% by weight of hydrogen fluoride and ethanol for a time sufficient to allow pores to reach the bottom of the etched back side holes. Pores typically grow at approximately 2.6 microns per minute in 0.01 Ohm-cm n-type wafers.

Front Side Catalyst Deposition

In a preferred embodiment, platinum is deposited through chemical deposition of platinum from platinum salt solutions onto the front side of a wafer. In an alternative embodiment, a sputtering process is used to produce, for example, a layer of platinum or other catalyst of approximately 100 to approximately 300 Ångstroms onto porous silicon.

Back Side Ohmic Contacts

According to a preferred embodiment of the present invention, Ohmic contact is formed on the back side of a wafer. For example, an Ohmic contact comprising a layer of approximately 0.5 microns of a conductive material such as aluminum, gold, silver, copper, other metals, or metal alloys is achievable through a sputtering process.

Packaging

In a preferred embodiment, gold conductive epoxy is used to attach a silicon electrode to a gold coated ceramic package. Gold coating of the ceramic package is achievable, for example, through an evaporation process wherein approximately 0.5 microns of gold is evaporated and deposited onto a ceramic package.

Membrane Fabrication

In a preferred embodiment of the present invention, a membrane solution, such as, but not limited to a solution of NAFION®, is coated onto each electrode at, for example, a temperature of approximately 70° C. The solution is spun on, or otherwise coated onto, the electrodes until an approximately 10 to 50 micron thick membrane layer is formed. While the membrane solution is still sticky, two electrode are pressed together to form a fuel cell, such as a bipolar fuel cell.

Preferred embodiments of fuel cell components shown in the accompanying figures comprise a honeycomb support structure, similar to that of a beehive, for added integrity. Support structures comprising shapes other than honeycomb are within the scope of the present invention.

Thin Layer Membrane Embodiment

Fuel cells of the thin layer membrane embodiment of the present invention optionally comprise at least one novel low stress thin film membrane comprising, for example, silicon nitride. In general, the membrane comprises an etch-processed, porous film that optionally comprises a conductive material, a dielectric material and/or both in the form of layers or otherwise. According to preferred embodiments of the present invention, such a thin film membrane is supported on its edges, like a drumhead. Such a film is created through, for example, a low pressure chemical vapor deposition ("LPCVD") process known in the art. According to the present invention, the thin film is less than approximately 20 microns, preferably less than approximately 10 microns, and most preferably less than approximately 5 microns. In a preferred embodiment, the thin film comprises a thickness of approximately 1 micron. In a preferred embodiment, the membrane is patterned, for example, with 1 micron diameter circles on a two micron pitch. The pattern, or mask, allows for creation of pores of same and/or similar size. Pores are created through, for example, an etching process, such as, but not limited to, a process comprising reactive ion etching (RIE).

Figure 15:
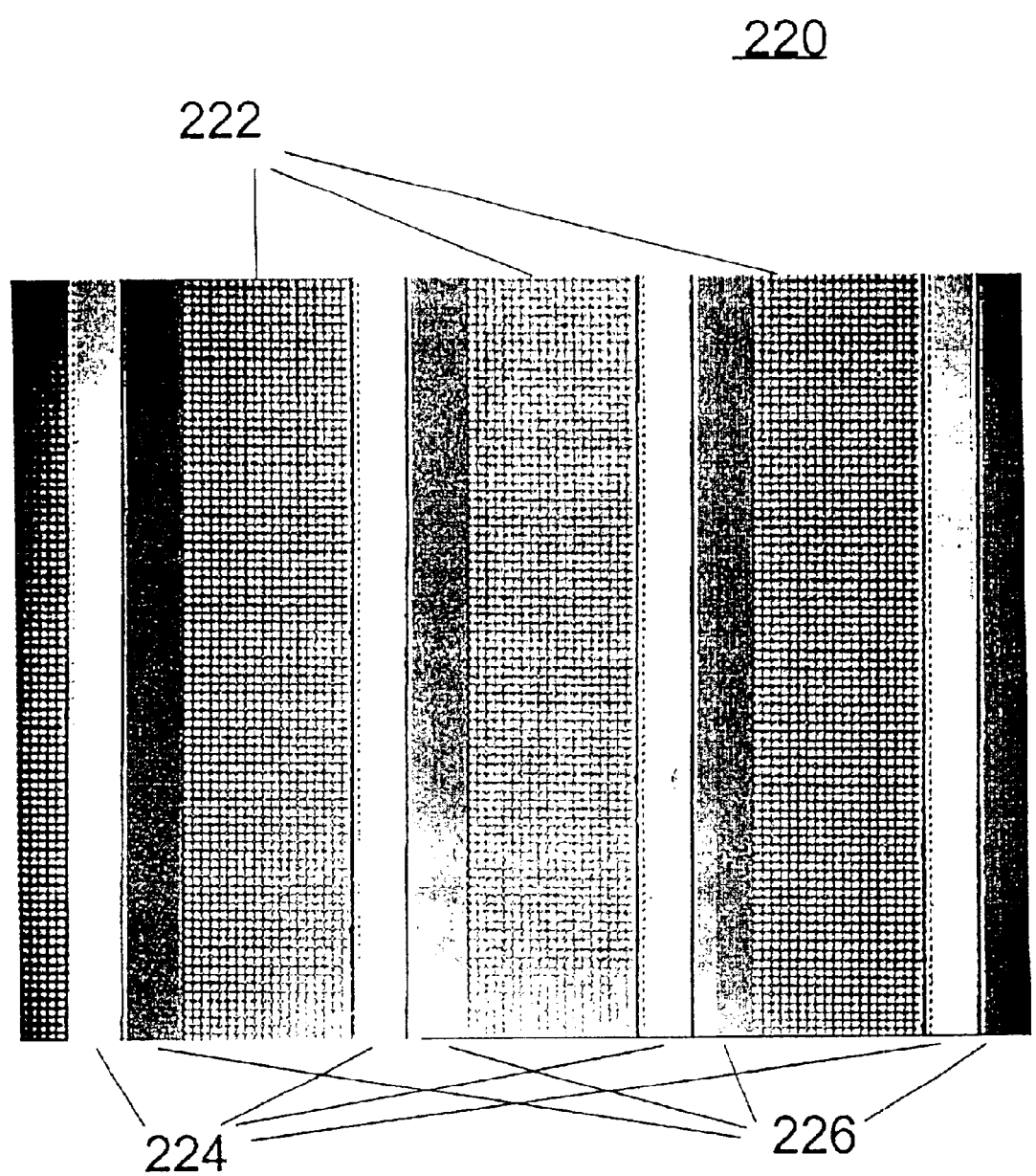
FIG. 15 is a plan view of a portion of an electrode array according to a preferred embodiment of the present invention.

FIG. 15 shows a section of a cell 220 comprising three complete approximately 40 micron wide electrodes 222 at approximately 50 times magnification. These electrodes comprise an approximately 1 micron thick silicon nitride thin film that has been etched with pores comprising approximately 1 micron diameters on approximately 2 micron centers. Conductive strips 224 to the right of each electrode are gold interconnects. The area between the electrodes are approximately 25 micron wide dielectric barriers 226 that insulate the electrodes from one another electrically. They also prevent, for example, hydrogen and oxygen, which arrive at the electrode surfaces from the bottom of the wafer, from mixing. Although this preferred embodiment comprises circles, the present invention is not limited to circle shaped pores.

The embodiment shown in FIG. 15 is also easily modified to create a cell like a bipolar plate of a conventional fuel cell stack. For example, every other barrier between anode and cathode is optionally coated with a conductive layer. Alternative embodiments allow for micro-switching devices that can selectively interconnect anodes and cathodes depending on the desired output. Such output optionally comprises series and/or parallel connections. Micro-switching devices for controlling the flow of fuel are also within the scope of the present invention.

In a preferred embodiment, pores are etched into and through the thin film using reactive ion etching (RIE) thereby creating an artificial porous membrane. The pores optionally comprise circles comprising smaller and/or larger diameters and/or a greater pitch. Of course, polygonal and ellipsoidal pores are within the scope of the present invention. Fuel cell anodes are spanned by such an artificial porous membrane and are, for example, approximately 40 microns wide and approximately 1 centimeter long, and cathodes are, for example, approximately 160 microns wide and 1 centimeter long. In this particular example, the cathodes surface area is approximately four times as large as the anode surface area. In such an embodiment, the area for oxygen interaction with catalyst is increased relative to the total area of anode and cathode combined. In many instances, the slower kinetics of the catalytic reaction at the cathode limits the power density of a fuel cell. Thus, an increase in cathode area with respect to anode area promotes overall power density. Of course, fuel cell plenums that supply fuel to an anode and/or a cathode are optionally sized to correspond to anode and/or cathode size. Thus, asymmetrical fuel cell plenums are within the scope of the present invention, for example, fuel cell plenums are optionally arranged asymmetrically side-by-side in a plane. These plenums provide, for example, access for fuel such as, but not limited to, hydrogen and oxygen. The plenums optionally comprise equal sizes or different sizes.

The slow kinetics of the ORR is the significant contributor to losses in a PEMFC under current. By increasing the ratio of cathode area to anode, this effect can be at least partially mitigated. This is impossible to do with a bipolar fuel cell design, but in the case of the of the planar fuel cell design, unequal cathode and anode areas becomes possible and desirable to increase the performance of the fuel cell. Thus, a preferred embodiment of the present invention comprises an approximately 160 micron wide oxygen cavity and a hydrogen cavity of approximately 40 microns in width, giving an approximately 4:1 ratio of oxygen to hydrogen cavity width. This ratio can be easily varied by mask layout, which is a feature of a planar fuel cell.

The pores in the thin film allow for gas diffusion and/or gas transport. In a preferred embodiment, the porous thin film membrane is coated with a catalyst. For example, hydrogen diffuses through the pores, arrives on the catalyst and ionizes to two protons. The protons generated at the anode may then enter an ionomeric membrane, which is in intimate contact with the catalyst containing membrane. Electrons released by hydrogen ionization enter a current collector, preferably comprised of gold, thereby allowing them to flow off the anode electrode. In the case of the cathode, the membrane is coated with a catalyst which is in intimate contact with the ionomeric membrane. Oxygen molecules diffuse and/or are transported through the artificial porous membrane, where they ionize on the catalyst. Protons which originated on the anode enter the ionomeric membrane thereby causing proton diffusion to the cathode, where protons combine with the oxygen ions and an electron from the current collector, to form a water molecule, completing the electrochemical process of the fuel cell. The catalyst-facilitated, electrochemical reaction generates an electrical potential across anode and cathode, which in turn, can produce current flow. As mentioned above, the present invention is not limited to a single anode or a single cathode, or a single cell. Multiple anode cells and/or multiple cathode cells, as well as multiple cell fuel cells are within the scope of the present invention.

Embodiments of the present invention that comprise novel porous thin film membranes overcome limitations found in conventional state of the art proton exchange membrane fuel cells, mainly because, conventional membrane porosity is difficult to engineer. The porous thin film membranes of the present invention are engineered according to standard lithography wherein pore size is limited by the lithography process. Modern mass production lithographic techniques known in the art are capable of producing features at least as small as approximately 0.18 micron. Therefore, membranes of the present invention comprising pores comprising, for example, approximately 0.18 micron diameters are within the scope of the present invention. Of course, the present invention is not limited to the current state of the art since it is expected that new technology will allow for the making of even smaller features. Basically, as lithographic and other techniques progress, pores can be fabricated with even smaller sizes and greater pitches.

As shown in FIG. 15, the thin film comprises gold wherein the distribution of gold is controlled, for example, through use of a mask. In a preferred embodiment, the at least one anode and at least one cathode comprise gold. Gold covered interstices (space between and defining pores) facilitate electron transport and conductivity with the gold electron collectors.

As mentioned above, the thin film membrane optionally comprises a catalyst. In an alternative embodiment, catalyst was applied to the front side of a wafer through chemical deposition and/or sputtering. In a preferred embodiment comprising a thin film membrane, catalyst is applied through, for example, a physical process such as, but not limited to, sputtering and/or evaporation and/or through an ink process wherein the catalyst is written onto the thin film. In a preferred embodiment, a platinum catalyst is applied after application of a preferably gold current collector.

As disclosed above, thin layer membranes are suitable for forming a variety of electrode configurations. This trait stems from silicon wafer and masking techniques known in the art and novel applications of these techniques to form thin layer membranes.

A preferred embodiment of the present invention comprises a method for making an inventive film. This method comprises the steps of: providing a support substrate, such as, but not limited to a silicon wafer; forming an etch "stop layer" on the substrate, such as, but not limited to, a silicon dioxide layer approximately 2 microns in thickness; forming a low stress and slightly tensile film on top of the stop layer, for example, a film comprising silicon nitride comprising a thickness of approximately less than 5 microns; patterning the film with a mask; etching the film to create pores, comprising, for example, a dry etch process comprising, for example, a gas plasma; cleaning off the residual mask material; patterning current collectors on the film with a mask; depositing a conductive material onto the film comprising, for example, an evaporative deposition process; cleaning off the residual mask material; protecting the porous film with a layer comprising, for example, photoresistive material; depositing/masking a photoresistive material on to the non-film side of the support structure; etching the non-film side of the support structure comprising, for example, a high aspect ratio etch process comprising high selectivity for the stop layer; cleaning off the residual mask material; removing the stop layer; and cleaning off protective layer from film.

In alternative embodiments, some of the aforementioned steps are optional. For example, in a preferred embodiment, the film comprises a conductive material, such as, but not limited to, a conductive polymer or the like (e.g., polyacetylene), gold, aluminum and/or platinum. In such embodiments, the film optionally comprises an etch stop; thereby eliminating the need for a separate etch stop layer.

In preferred embodiments, the etch-processed film comprises a conductive porous film. In a preferred embodiment, the etch-processed, conductive, porous film comprises at least one electrode. Again, the etch-processed, conductive, porous film comprises at least one layer wherein the layer comprises at least one layer comprising a conductive layer and a dielectric layer.

Fuel cells according to the present invention comprise fuels such as, but not limited to, hydrogen, air, methanol, hydrocarbons, alcohol, and other materials comprising redox pairs.

Flow paths for fuels and waste products comprise a variety of geometries, including channels and/or conduits.

Although the term planar is used herein, fuel cells of the present invention are not limited to planar geometry. Fuel cells comprising curved surfaces, flexible surfaces, and other geometries (such as cylindrical, polygonal, and the like) are within the scope of the present invention.

Fabrication of Other Components Using Technology of the Present Invention

According to the present invention, processed films are useful for injection molding and/or embossing processes. For example, the compact disc industry commonly coats a substrate with metal to create a master. The master is then used to emboss compact discs. In most instances, the master must have ultraflat properties, as known to those in the art, to produce compact discs of adequate quality. According to the present invention, a processed film serves as a master. In a preferred embodiment, the processed film master comprises resilience thereby allowing it to conform to the shape of the object to be embossed. In another preferred embodiment, the processed film serves as a mold, for example, a mold used in injection molding. In yet another preferred embodiment, a mold comprises an etched silicon wafer alone or in addition to a processed film.

In a preferred embodiment, the present invention comprises a method of embossing a substrate comprising the steps of: providing a support substrate; forming a film on the support substrate; patterning features to the film; providing a second substrate; and embossing features of the film into the second substrate; and preferably wherein patterning comprises at least one step selected from the group consisting of adding material to the film and subtracting material from the film.

In a preferred embodiment, the present invention comprises a method of making a mold comprising the steps of: providing a silicon substrate; patterning the silicon substrate; and contacting the silicon substrate with a deformable material thereby imparting the pattern to the deformable material, and preferably wherein patterning comprises at least one step selected from the group consisting of adding material to the film and subtracting material from the film.

According to the present invention, technology disclosed herein is suitable for patterning, which, for example, includes etching and other processes capable of adding and/or subtracting material from a film and/or wafer.

Gas Permeation Studies of Wafer Membrane Embodiments

Gas permeation through inventive porous $n^+$-Si membranes was investigated. The investigations comprised testing a series of gases ranging from $H_2$ to Xe, including a nerve gas stimulant dimethyl methyl phosphonate (DMMP). Conductance was found to be constant over a pore inlet pressure range of 0.1 to 10 Torr, establishing molecular flow as the transport mechanism. An approximate correlation was found between conductance and the inverse square root of the gas molecular weight, as expected for molecular flow. Transport rates compare very well with previously investigated $n^+$-Si membranes.

Comparison of measured and calculated transport rates indicate a membrane porosity of 64%, well within the range of expected porosity. An anomalous low transition pressure (200 Torr) was observed for these membranes where the flow became viscous. One possible explanation for this observation is the presence of large cross-sectional parameter defects. Calculations indicate that these defects could be 16 micron cylindrical pores at densities as low as two per membrane. Large diameter defects would significantly reduce the efficiency of side wall mediated processes due to a reduction of the number of gas/side wall collisions during the transit of a molecule.

The results summarized above are disclosed in detail below. The gas permeation tests were designed to examine the characteristics of approximately 50 micron thick membranes formed in $n^+$-Si (density of approximately 0.005 to approximately 0.02 $\Omega$cm). Five membranes were generated by anodizing residual 50 micron thick films formed by KOH etching. The membranes were anodized at an estimated current density of approximately 50 mA/cm$^2$ for approximately 82 minutes in an approximately 1:1 HF/EtOH electrolyte. Membrane conductance values were determined from measurements of the inlet ($P_i$) and outlet ($P_o$) pressures of the pores and computing a conductance based thereon ($C=(400 \text{ l/s})/((P_i/P_o)-1)$) where 400 l/s corresponds to the pore outlet pumping speed, which is equivalent to the system pumping speed). Inlet pressures were measured with a temperature stabilized capacitance diaphragm gauge while outlet pressures were measured by a $N_2$ calibrated (NIST traceable) ion gauge. The ion gauge was calibrated for the other gases investigated by measuring a gauge sensitivity using a $N_2$ calibrated (NIST traceable) spinning rotor gauge.

Results show that gas transport through the membranes is molecular for pressures below 10 Torr. The conductance varies as a function of the gas type and, as expected for molecular flow, is independent of pressure. The subtle oscillations seen in plots of conductance versus pressure are the result of discrete pressure steps and timing offsets and time constants for the gauges used to measure $P_i$ and $P_o$.

The measured area conductances (normalized to membrane area) of these membranes are $5.16\times10^{-3}$ and $1.68\times10^{-3}$ l/cm$^2$s for He and $O_2$, respectively. These values compare favorably to He and $O_2$ values previously reported as $5.16\times10^{-3}$ and $1.85\times10^{-3}$ l/cm$^2$s [Memo, "Preliminary Results for H; and 0; Transport through Porous Silicon (PS) Membranes", K. R. Zavadil, Jun. 10, 1997].

Calculation of expected conductance values using a mean pore diameter of 8.8 nm, a length of 50 microns and a pore size distribution given by Herino et al. [R. Herino, G. Bornchil, K. Baria, C. Bertrand and J. L. Ginoux, J. Electrochem. Soc. 134(8) 1987, 1994] produce equivalent values at 64% porosity. This degree of porosity is well within the limits for the current density and HF concentration used for anodization. The response of these membranes has also been measured for a series of additional gases. The values from experiments were plotted as a function of the inverse square root of the gas molecular weight to demonstrate that this expected relationship is approximately adhered to for transport in these pores. The line in this plot shows the expected linear dependence. The fact that significant deviation is observed at both low and high molecular weights suggests that either excess flow is supported by an alternate transport mechanism (as previously observed for $H_2$) or that much larger than expected variation in system pumping speed is occurring, skewing the measured values.

The conductance becomes difficult to measure at inlet pressures below a 100 mTorr. This effect is visible in the data where the measured conductance appears to decrease slightly at the lower pressures. This effect possibly results from a drift in the baseline ion gauge readings, where the ion gauge is used to measure the pore outlet pressure. The system was reconfigured to minimize this drift and extend the lower limit of quantification of conductance to inlet pressures of less than 1 mTorr. The conductance measured for DMMP, measured at 2 mTorr, demonstrates how minimization of drift can yield conductance values at low inlet pressures.

Defect structure appears to be the primary mechanism of gas transport in these membranes, despite the correlation of experimental and expected results. From data for membrane response to elevated pore inlet pressures in excess of the 10 Torr limit, it was found that beyond 10 Torr the conductance starts to increase and eventually scales linearly with pressure. This type of response is typical for a capillary in the transition and eventually viscous flow regime. The response of an array of capillaries is calculated by using the integrated form of the Knudsen equation:

$$C=nC_M[0.5 \, \delta^2+0.81 \, \delta-0.009 \, \ln(1+21 \, \delta)]$$

where n is the number of pores and $\delta$ is a unitless parameter equivalent to the ratio of the pressure diameter product at any value relative to the value where the viscous conductance ($C_V$) is equivalent to the molecular conductance ($C_M$). Data show the expected variation in conductance with pressure if a weighted distribution of 5.3 to 11.3 nm pores were responsible for flow [R. Herino. G. Bornchil, K. Baria, C. Bertrand and J. L. Ginoux, J. Electrochem. Soc. 134(8) 1987, 1994]. The fact that the transition flow regime is predicted to occur above a 1000 Torr for this pore size distribution, indicates that a significantly larger cross-sectional parameter structure must be responsible for the flow-observed in these membranes. A search for a reasonable fit to the experimental data yields an average pore diameter of 16 microns for the transmissive structure. Approximately 2 pores/membrane at a pore diameter of 16 microns would be required to support the measured flow through these membranes.

An alternate explanation would be the presence of these defects producing the anomalous low transition pressure while the residual flow would be supported by pores in the expected 5.3 to 11.3 nm range.

Results show a combined response (bi-modal distribution) of the expected pore distribution at 10% porosity along with approximately 8, approximately 16 micron diameter pores distributed among the 5 membranes. The resulting curve under-predicts the conductance through the transition flow region. Calculations show that attempts to alter this bi-modal distribution by shifting the defect diameter toward approximately 1 micron while increasing the contribution from the expected pore population leads to a more severe underestimation of conductance.

Results indicate that defect structure might be responsible for a significant amount of flow in the membranes studied. The presence of large cross-section parameter defects could significantly impact applications where pore side wall collisions control a desired process. Chemistry generated by surface catalysis or time dependent separation created by adsorption are two processes whose efficiency would be drastically reduced due to a reduction in the number of side wall collisions experienced by a molecule during pore transit. The previous example of a bi-model pore size distribution provides some indication of the severity of this problem. In the above example, 84% of the flow is being carried by the large pores when pressure is kept below approximately 20 Torr. With viscous flow through these pores, the percentage of flow increases to approximately 95% at 700 Torr. These values indicate that the intended, smaller diameter pores would play a secondary role in the desired process.

Further experimental results are disclosed below regarding fuel cells of the present invention. The aforementioned experiments show evidence of macro-structural defects in the porous silicon substrates as evidenced by low pressure thresholds for molecular-to-viscous flow in both p- and n-Si membranes. These defects were eliminated by drying the membranes using super-critical $CO_2$ extraction. Previously, all side-supported Si membranes had been air dried after extended immersion in $H_2O$.

Based on these results, the structure responsible for the viscous transport behavior was most probably inter-pore cracking resulting form the capillary force present during drying. As a first attempt at minimizing capillary force, back-supported membranes were immersed in isopropanol—which has a surface tension approximately one-third that of water. Experimental results show that membranes can be dried from $C_3H_7OH$ without detriment to the pore structure. However, a question remained as to whether the membranes could survive drying with $H_2O$ penetrating the pore structure—an issue relevant for fuel cell applications where membranes are exposed to $H_2O$ and may undergo some degree of hydration/dehydration cycling.

Experiments wherein a hydration/dehydration cycle on a back-supported membrane (n-Si, approximately 0.005 to approximately 0.02 $\Omega$cm) were performed. The membrane was taken from an immersion bath of $C_3H_7OH$ and transferred directly to de-ionized $H_2O$ (18 M $\Omega$cm) without drying. The goal was to utilize the miscibility of $C_3H_7OH$ and $H_2O$ to provide for full wetting of the pores. The membrane remained immersed for a 16 hour period and was allowed to air dry. The results show that the membrane exhibits molecular flow for pressures up to 1000 Torr with a permeability for He of $7 \times 10^{-8}$ mol $s^{-1} m^{-2} Pa^{-1}$. This value lies within the range of He permeabilities measured for a combination of three other back- and side-supported n-Si (approximately 0.005 to approximately 0.02 $\Omega$cm) membranes anodized under similar conditions (approximately $5 \times 10^{-8}$ to approximately $1 \times 10^{-7}$ mol $s^{-1}$ $m^{-2}$ $Pa^{-1}$). The results support the conclusion that back-supported membranes survive mechanical stresses during drying.

The low apparent porosity of these membranes was also examined. A calculated expected permeability values of $5 \times 10^{-6}$ mol $s^{-1}$ $m^{-2}$ $Pa^{-1}$ is based on a mean pore diameter of 10 nm and a maximum porosity of 50%. The values measured suggest an apparent porosity of several tenths of a percent. Two explanations exist for these low values: tapered diameter pores (diameter decreasing from the anodization side inward) and a high density of terminated or branched pores that never penetrate the back of the membrane. Both of these possibilities would create a high volumetric porosity measured through mass loss but a low cross-sectional profile for open pore area. The existence of a depletion layer and limited hole mobility might be a possible explanation for pores not breaking through. The argument would be that the only pores that do break through are located close to the honeycomb support structure because of kinetic limitations of hole injection into and transport through the thinning membrane overlayer. Variations in vertical porosity, presumably due to varying pore diameter, have been observed by Herino et al. in 0.01 $\Omega$cm n-Si previously (J. Electrochem. Soc., 134(8). 1987, p 1994).

To see if permeability might increase, the back of a side-supported membrane was etched. A membrane from a particular run was placed with the support structure upward on a polyethylene support ring. A drop of approximately 49% by weight of hydrogen fluoride was placed on the support structure. The HF remained on the membrane back for 45 minutes with no sign of penetration to the membrane front. The etching was quenched in de-ionized $H_2O$ and the membrane allowed to dry. He permeation testing produced a value of $5 \times 10^{-6}$ mol $s^{-1}$ $m^{-2}$ $Pa^{-1}$. The rise in this value at high pressure is the result of decreased system pumping speed. The increased gas transport results either from the exposure of 5 times as many pores or a 1.7-fold increase in mean pore diameter. Removal of a depletion derived low porosity layer is plausible because the etch time used would result in removal of 9 nm of Si (assuming an etch rate of 0.2 nm $s^{-1}$), a reasonable estimate of the depletion layer thickness expected in n-Si (S. R. Morrison, "Electrochemistry at Semiconductor and Oxidized Metal electrodes," Plenum, 1980, p 69). Preferential pore widening at the back of the membrane is plausible because we have indirect evidence that the etchant does not penetrate the full length of the pore and radial mass transport within the pore would limit the extent of pore side wall etching moving into the membrane.

Permeabilities add in reciprocal arguing that the removal of material at a restriction would have the greatest effect on transport. This experiment did not distinguish between these two possibilities. The use of reactive ion etching, after anodization, would however help determine what the transport barrier is by studying the increase in permeability with incremental removal of front and rear layers of the membrane. Fluid condensation in the pores is not a possibility. Pore inlet gas pulse measurements for Xe and $SF_6$ show no sign of a time lag in the millisecond to second time regime. The difference in diffusion coefficient for a free pore to a fluid-filled pore ($10^{-2}$ to $10^{-5}$ $cm^2$ $s^{-1}$) should produce a shift in lag time from the sub-millisecond regime to a value of up to several seconds, depending on the extent of pore filling.

Results from the aforementioned experiments show that porous Si micromachined gas permeable membranes can be fabricated, that the transport can be characterized as Knudsen flow, that permeability is calculable for any gas, and that the back supported hexagonal support allows for a robust membrane.

Pt Deposition

Initial deposition of platinum used electroless deposition of Pt in solutions between approximately 0.01 M and approximately 0.001 M concentration, at a pH of approximately 2.5 to approximately 4.5 (adjusted through use of, for example, HCl). This deposition method resulted in micron thick films. The goals for the Pt catalyst layer are that the Pt layer must not obscure pores and block flow of gas. Other catalytic materials may be used.

Fuel Cell Performance

Figure 17:
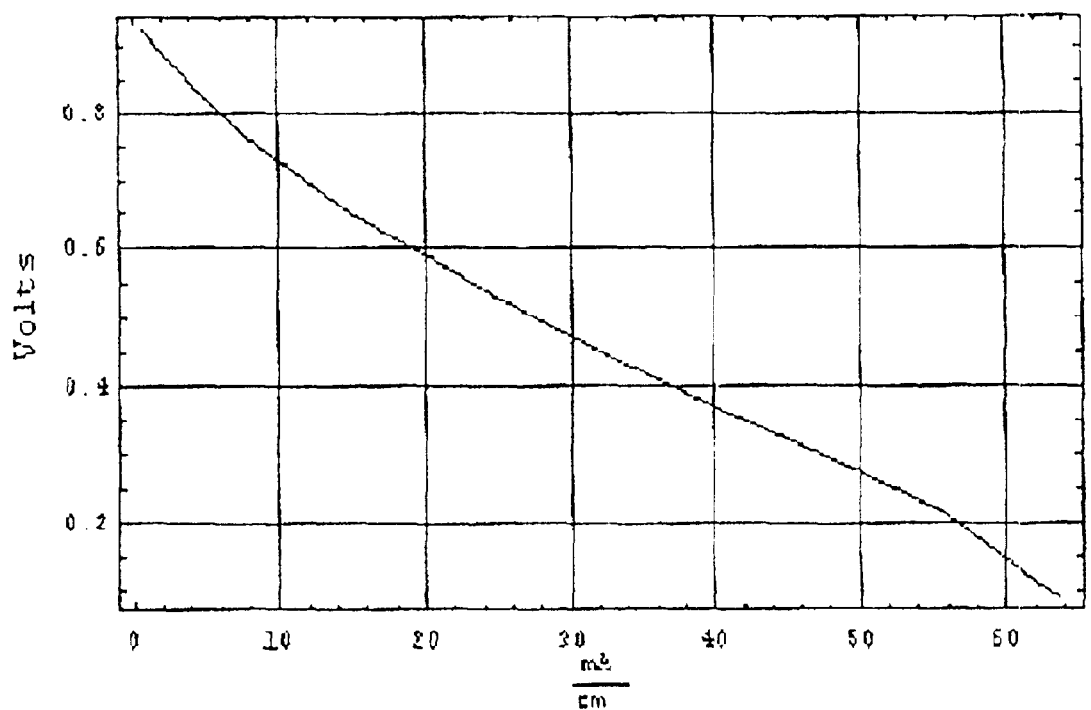
FIG. 17 is a plot of polarization for a fuel cell according to a preferred embodiment of the present invention.

Using Nation films, fuel cells were tested in a sandwich configuration. Performance is shown in FIG. 17 as a polarization curve.

Permeation measurements were made using equipment to show that hydrogen flows through the anode and cathode of an apparatus of the present invention at approximately 5 ml $min^{-1}$. However, blocking the cathode from air flow did not completely shut down the fuel cell. Performance dropped by approximately 50% suggesting that oxygen was still able to diffuse into the perimeter of the fuel cell.

In general, efficiency of hydrogen utilization results from, for example: improvements in hydrogen flow; improvements in the porosity of the gas diffusion support structure, including the catalyst (e.g., platinum) coating; improvements in electrolyte deposition; and improvements in the catalyst/electrolyte interface. Electrolyte deposition is improved, for example, by depositing membranes from solution and/or hot pressing of polymer films, e.g., NAFION® films.

Figure 16:
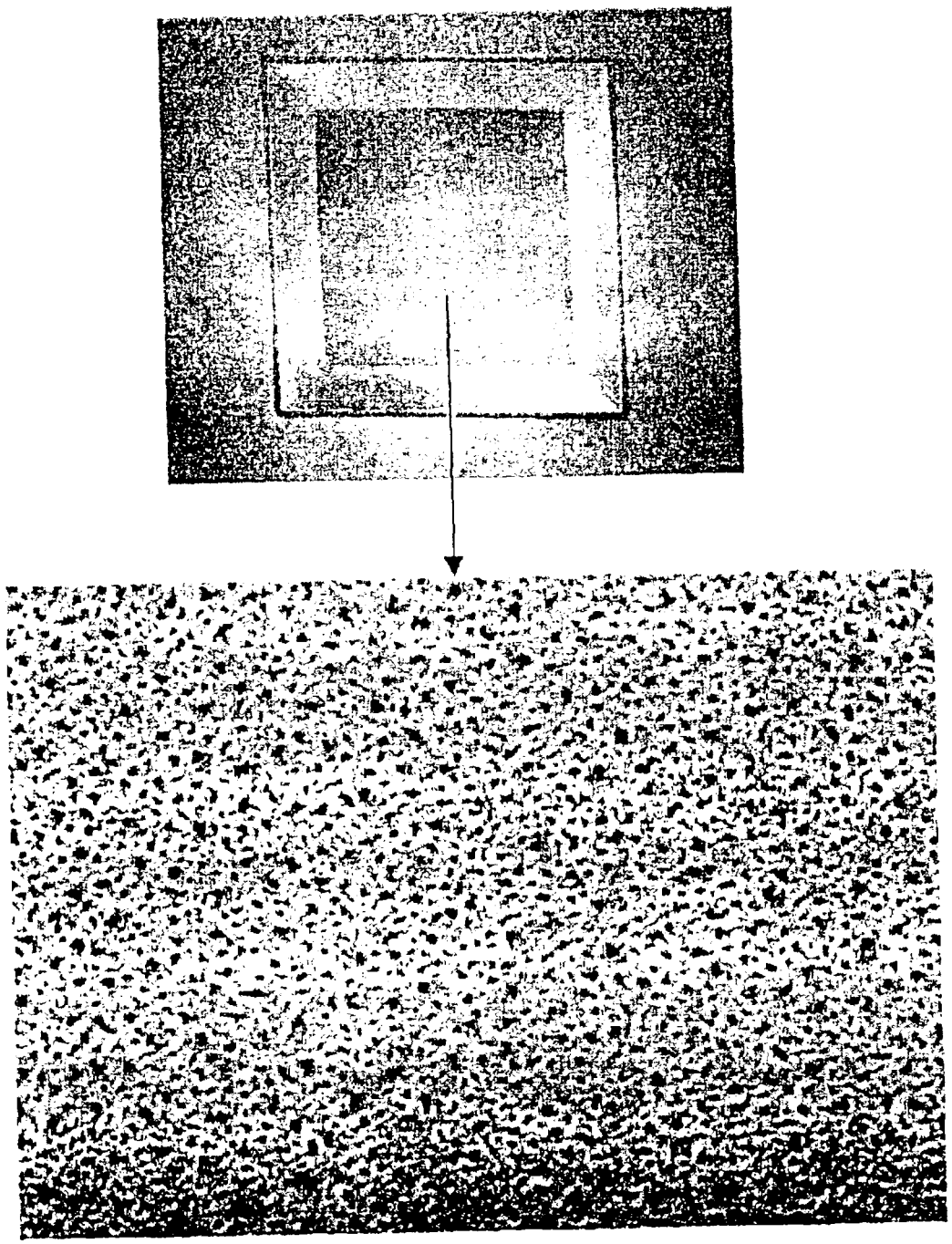
FIG. 16 is an electron micrograph plan view of an anodized silicon membrane according to a preferred embodiment of the present invention.

Referring to FIG. 16, a porous silicon-based membrane of the present invention is shown. The micrograph is of a n⁺-Si unsupported approximately 50 mm membrane anodized at approximately 50 mA cm⁻².

Fuel cells of the present invention are suitable for use in a wide range of applications as a suitable replacement for batteries. Applications range from consumer electronic devices (cell phones, PDAs, laptop computers). Applications such as integrated or removable chip-based power sources for micromachinines is particularly compelling. In this application, the fuel cell power converter can be fabricated on the same wafer as the micromachine to enable chip based integrated microsystems that have the functions of, for example, sensing, thinking, communicating, communicative functions, and micromachine actions. Microrobotics, for example, enable by such fuel cell on a chip power is suitable for, but not limited to, robotic vehicles.

As mentioned above, the present invention comprises the ability for configuration and operation at high temperatures. High temperature (approximately 100° C. to greater than approximately 1000° C.) configuration/operation of apparatus of the present invention simplifies fueling and enables direct utilization of hydrocarbon or alcohol fuels. High temperature operation/configuration also enables internal reforming of these fuels to produce hydrogen as the primary fuel.

According to the present invention, a high temperature operation/configuration is enabled through the use of known oxide conductors such as zirconia based electrolytes (e.g., yttria stabilized zirconia or YSZ) on platinum or other refractory catalysts and current collectors on top of the silicon membrane, preferably comprised of silicon nitride. In this simple configuration, platinum or other suitably refractory materials perform as both the dispersed catalyst and as the current collector.

Possible YSZ electrolyte compositions that could be deposited by solution methods, sputter methods, slurry, tape or other methods include the formulation 0.9 $ZrO_2$+0.1 $Y_2O_3$ as well as the formulation 0.9 $ZrO_2$+0.04 $Y_2O_3$+0.06 $Sc_2O_3$.

According to the present invention, both oxide conducting and proton conducting high temperature electrolytes can be used. High temperature catalyst materials that are optionally deposited by solution, sputter, CVD or other methods include Noble metals: Pt, Au, Ag, Pd, Ag/Pd alloy, as well as non-Noble metals: Ni, Co, Cu, Fe and oxides: $PrO_2$, $CeO_2$, $In_2O_3$ as well as oxide compositions such as manganites and cobaltites.

The present invention also allows for rapid device development and optimization. The example shown above wherein the fabrication approach yielded 18 fuel cell devices (many thousand of individual cells) on a single wafer enables the combinatorial optimization of component materials (e.g., catalysts, membranes and device designs (electrode geometries, membrane pore size, water management techniques, . . . ). In this manner individual device geometries and other design parameters are optionally varied systematically through mask design, catalysts and membranes could be systematically varied through controlled deposition (masks for CVD or sputter deposition) or controlled delivery of liquid formulations (e.g., ink jet depositions).

Parallel diagnostics of the multi-device wafer is accomplished using embedded sensors, optical screening or thermal imaging of the multi-device wafer for thermal measurement of individual devices or through "docking" a wafer characterization module to the wafer to provide parallel measurement of individual device performance (gas consumption, voltage, current, heat, pH).

In this manner many device configurations can be evaluated in a parallel rather than traditional cut and try serial development fashion. Individual device designs or formulations can be rapidly optimized and knowledge of correlation of device design/material trade-offs assessed. For example, $10^4$ fuel cell electrode pairs are fabricated on a chip. In these chips, for example, the catalyst formulation is varied in a known way across the surface area of the wafer. Next, each fuel cell is examined, e.g. measurement of the polarization curve for 10 seconds. Overall, this combinatorial technique compresses millions of person-hours of experimental work into approximately one day.

Various embodiments of the present invention allows for, for example, fuel cell integration with electronic devices; mass production of fuel cells using automated tools of Semiconductor Manufacturing industry; thinner membrane and consequently higher proton mobility; semiconductor type interconnects and thus higher current collection efficiency; a flexible prismatic form factor; scalability; elimination, in some embodiments, of endplates, bolts, or tie rods; higher energy density; rapid optimization; integration with a chemical or metal hydride $H_2$ storage system; chip-based electrolyzers for recharging; power management integration; liquid fuel integration (e.g. MeOH); flexible use of pre-cast or other membranes; control over a 3-way interface microstructure by building an interface from the "ground up" from a polished, rigid Si wafer surface to catalyzed pores with an engineered pore size; placement of catalyst and ionomer at a controlled depth into the pore by electrochemical deposition and spin casting; and reduction in ionomer membrane thickness.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A fuel cell comprising:
   a dielectric substrate material having upper and lower surfaces;
   a porous film disposed on said upper surface of said dielectric substrate material and comprising a silicon-based thin film membrane;
   said porous film comprising at least one electrode; and
   channels extending through said dielectric material from said upper surface to said lower surface.

2. The fuel cell of claim 1 additionally comprising a fuel source disposed in relation to apertures of channels on said lower surface of said dielectric material.

3. The fuel cell of claim 2 wherein said fuel source comprises at least one member selected from the group consisting of hydrogen gas, alcohols, and other compounds containing redox pairs.

4. The fuel cell of claim 3 wherein an oxygen source of said fuel cell is ambient air.

5. The fuel cell of claim 1 wherein said porous film is etch-processed.

6. The fuel cell of claim 1 wherein said porous film comprises a solid electrolyte.

7. The fuel cell of claim 6 wherein said solid electrolyte comprises a proton exchange polymer.

8. The fuel cell of claim 7 wherein said proton exchange polymer comprises a perfluorosulfonate ionomer.

9. The fuel cell of claim 8 additionally comprising a moisture cap.

10. The fuel cell of claim 7 wherein said solid electrolyte is disposed on said dielectric substrate by a method comprising spin coating, lamination, or spraying.

11. The fuel cell of claim 6 wherein said solid electrolyte comprises an oxide conducting electrolyte.

12. The fuel cell of claim 11 wherein said oxide conducting electrolyte comprises a zirconia-based electrolyte.

13. The fuel cell of claim 11 wherein a catalyst is disposed on said solid electrolyte and wherein said catalyst comprises a refractory material.

14. The fuel cell of claim 13 wherein said refractory material is selected from the group consisting of platinum, Ru, or a Pt—Ru alloy.

15. The fuel cell of claim 11 having operation temperatures between approximately 100° C. and approximately 1000° C.

16. The fuel cell of claim 7 wherein said solid electrolyte comprises a high temperature proton-conducting electrolyte.

17. The fuel cell of claim 1 wherein said thin film membrane comprises at least one member selected from the group comprising silicon nitride and silicon carbide.

18. The fuel cell of claim 1 wherein said silicon-based thin film membrane comprises a low stress, pre-tensioned membrane.

19. The fuel cell of claim 1 wherein said silicon-based thin film membrane comprises a thickness between approximately 0.5 $\mu$m and approximately 20 $\mu$m.

20. The fuel cell of claim 19 wherein said silicon-based thin film membrane comprises a thickness between approximately 1 $\mu$m and approximately 10 $\mu$m.

21. The fuel cell of claim 20 wherein said silicon-based thin film membrane comprises a thickness between approximately 1 $\mu$m and approximately 5 $\mu$m.

22. The fuel cell of claim 21 wherein said silicon-based thin film membrane comprises a thickness of approximately 1 $\mu$m.

23. The fuel cell of claim 1 wherein said silicon-based thin film additionally comprises a patterned and etched geometric array comprising an approximately 1 $\mu$m diameter and an approximately 2 $\mu$m pitch.

24. The fuel cell of claim 23 wherein said silicon-based thin film membrane comprises a thickness of approximately 1 $\mu$m.

25. The fuel cell of claim 1 wherein said silicon-based thin film membrane is formed through low pressure chemical vapor deposition.

26. The fuel cell of claim 1 wherein pores are formed in said silicon-based thin film membrane through reactive ion etching.

27. The fuel cell of claim 1 wherein said thin film comprises a mask for an anodization etching process.

28. The fuel cell of claim 1 wherein said porous film comprises a conductive layer.

29. The fuel cell of claim 28 wherein said conductive layer comprises at least one material selected from the group consisting of gold, aluminum, platinum, other metals, metal alloys, and a conductive organic material.

30. The fuel cell of claim 28 wherein said conductive layer comprises at least one catalyst.

31. The fuel cell of claim 28 wherein said catalyst is disposed on said conductive layer to comprise a porous catalyst.

32. The fuel cell of claim 30 wherein said catalyst comprises a material selected from the group comprising platinum, ruthenium, and platinum-ruthenium alloys.

33. The fuel cell of claim 30 wherein said catalyst comprises a catalyst for high temperature operation comprised from a member of the group consisting of alloys of Noble metals, non-Noble metals, metal oxides, and oxide compositions.

34. The fuel cell of claim 33 wherein said Noble metals are selected from the group comprising Pt, Au, Ag, Pd, and Ag/Pd alloys.

35. The fuel cell of claim 33 wherein said non-Noble metals are selected from the group comprising Ni, Co, Cu, and Fe.

36. The fuel cell of claim 33 wherein said metal oxides are selected from the group comprising $PrO_2$, $CeO_2$, and $InO_3$.

37. The fuel cell of claim 33 wherein said oxide compositions are selected from the group comprising manganites and cobaltites.

38. The fuel cell of claim 30 wherein said conductive layer and said catalyst are disposed by at least one method selected from the group consisting of chemical vapor deposition, physical deposition, evaporation, and ink deposition.

39. The fuel cell of claim 1 wherein said at least one electrode comprises at least one anode and at least one cathode.

40. The fuel cell of claim 39 wherein said anode and said cathode comprise different surface areas.

41. The fuel cell of claim 40 wherein said surface area of said anode comprises between approximately two times and approximately ten times less surface area than said surface area of said cathode.

42. The fuel cell of claim 41 wherein said surface area of said anode comprises approximately four times less surface area than said surface area of said cathode.

43. The fuel cell of claim 42 wherein said surface area of said anode comprises a width of approximately 40 $\mu$m and a length of approximately 1 cm, and wherein said cathode comprises a width of approximately 160 $\mu$m and a length of approximately 1 cm.

44. The fuel cell of claim 39 wherein said at least one anode comprises a width of between approximately 10 $\mu$m and approximately 200 $\mu$m.

45. The fuel cell of claim 39 wherein said at least one cathode comprises a width of between approximately 10 $\mu$m and approximately 200 $\mu$m.

46. The fuel cell of claim 37 wherein said anodes and said cathodes are interposed in interdigitated planar relation.

47. The fuel cell of claim 46 wherein said anodes and said cathodes comprise a configuration selected from the group consisting of parallel, series, or combined parallel-series configurations.

48. The fuel cell of claim 39 wherein said at least one anode and said at least one cathode comprise serpentine or spiral patterns.

49. The fuel cell of claim 1 wherein said dielectric substrate comprises a silicon-based material.

50. The fuel cell of claim 49 wherein said dielectric substrate comprises silicon nitride.

51. The fuel cell of claim 1 wherein said channels are formed by joining at least two micromachined wafers.

52. The fuel cell of claim 1 wherein said channels comprise pores within said dielectric substrate.

53. The fuel cell of claim 52 wherein said dielectric material surrounding said channels comprises a dielectric barrier.

54. The fuel cell of claim 53 wherein every other said dielectric barrier between an anode and a cathode comprises a conductive layer coating.

55. The fuel cell of claim 53 wherein said dielectric barrier comprises a width between approximately 10 $\mu$m and approximately 50 $\mu$m.

56. The fuel cell of claim 55 wherein said dielectric barrier comprises a width of approximately 25 $\mu$m.

57. The fuel cell of claim 52 wherein said pores are formed by reactive ion etching.

58. The fuel cell of claim 52 wherein said pores comprise at least one flow path for providing fuel to said at least one electrode.

59. The fuel cell of claim 1 wherein an aperture of said channels corresponds approximately to surface areas of said electrode.

60. The fuel cell of claim 1 wherein pores of said porous film have a diameter of between approximately 5 nm and approximately 1000 nm.

61. The fuel cell of claim 1 wherein surfaces within said cell comprise geometries selected from the group comprising planes, curved surfaces, flexible surfaces, and cylinders.

62. The fuel cell of claim 61 wherein apertures of said cylinders may comprise geometric figures selected from the group consisting of triangles, rectangles, circles, polygons, and ellipses.

63. A bipolar fuel cell comprised of two fuel cell units as in claim 1 wherein said upper surfaces of said units are in joined connected relation.

64. The bipolar fuel cell of claim 63 wherein said at least one electrode of one of said units comprises an anode and said at least one electrode of remaining said unit comprises a cathode.

65. The fuel cell of claim 1 wherein said lower surface of said dielectric substrate material comprises a coating comprising an ohmic contact.

66. The fuel cell of claim 65 wherein said ohmic contact is comprised of a material selected from the group comprising aluminum, gold, silver, other metals, and metal alloys.

67. The fuel cell of claim 1 additionally comprising micro-switching devices.

68. The fuel cell of claim 67 wherein said micro-switching devices selectively interconnect said electrodes.

69. The fuel cell of claim 67 additionally comprising micro-switching devices within said channels for controlling a fuel flow.

70. The fuel cell of claim 1 additionally comprising cooling means for reducing a fuel cell temperature.

71. The fuel cell of claim 1 formed entirely by semiconductor manufacturing methods.

72. A fuel cell comprising an etch and anodization processed, porous electrode.

73. The fuel cell of claim 72 wherein said electrode is silicon-based and wherein said silicon is doped.

74. A fuel cell comprising:
a dielectric substrate material having upper and lower surfaces;
a porous film disposed on said upper surface of said dielectric substrate material and comprising a solid electrolyte comprising a proton exchange polymer comprising a perfluorosulfonate ionomer;
said porous film comprising at least one electrode;
channels extending through said dielectric material from said upper surface to said lower surface; and
a moisture cap.

75. A fuel cell comprising:
a dielectric substrate material having upper and lower surfaces;
a porous film disposed on said upper surface of said dielectric substrate material;
said porous film comprising at least one electrode comprising at least one anode and one cathode comprising different surface areas; and
channels extending through said dielectric material from said upper surface to said lower surface.

76. A fuel cell comprising:
a dielectric substrate material having upper and lower surfaces;
a porous film disposed on said upper surface of said dielectric substrate material;
said porous film comprising at least one electrode comprising at least one anode and one cathode, wherein said anodes and said cathodes are interposed in interdigitated planar relation; and
channels extending through said dielectric material from said upper surface to said lower surface.

77. A fuel cell comprising:
a dielectric substrate material having upper and lower surfaces;
a porous film disposed on said upper surface of said dielectric substrate material;
said porous film comprising at least one electrode comprising at least one anode and one cathode, wherein said at least one anode and said at least one cathode comprise serpentine or spiral patterns; and
channels extending through said dielectric material from said upper surface to said lower surface.

78. A fuel cell comprising:
a dielectric substrate material having upper and lower surfaces and comprising silicon nitride;
a porous film disposed on said upper surface of said dielectric substrate material;
said porous film comprising at least one electrode; and
channels extending through said dielectric material from said upper surface to said lower surface.

79. A fuel cell comprising:
a dielectric substrate material having upper and lower surfaces;
a porous film disposed on said upper surface of said dielectric substrate material;
said porous film comprising at least one electrode; and
channels extending through said dielectric material from said upper surface to said lower surface, wherein said channels comprise pores within said dielectric substrate, wherein said dielectric material surrounding said channels comprises a dielectric barrier, and wherein every other said dielectric barrier between an anode and a cathode comprises a conductive layer coating.

80. A fuel cell comprising:
a dielectric substrate material having upper and lower surfaces;
a porous film disposed on said upper surface of said dielectric substrate material;
said porous film comprising at least one electrode; and channels extending through said dielectric material from said upper surface to said lower surface, wherein said lower surface of said dielectric substrate material comprises a coating comprising an ohmic contact.

81. A fuel cell comprising:

a dielectric substrate material having upper and lower surfaces;

a porous film disposed on said upper surface of said dielectric substrate material;

said porous film comprising at least one electrode;

channels extending through said dielectric material from said upper surface to said lower surface; and micro-switching devices.

82. A fuel cell comprising:

a dielectric substrate material having upper and lower surfaces;

a porous film disposed on said upper surface of said dielectric substrate material;

said porous film comprising at least one electrode; and channels extending through said dielectric material from said upper surface to said lower surface; and wherein one or more widths are provided from the group consisting of at least one said anode comprising a width of between approximately 10 $\mu$m and approximately 200 $\mu$m, at least one said cathode comprising a width of between approximately 10 $\mu$m and approximately 200 $\mu$m, and said dielectric barrier comprising a width between approximately 10 $\mu$m and approximately 50 $\mu$m.

* * * * *